(12) United States Patent
Nishida

(10) Patent No.: US 6,747,758 B1
(45) Date of Patent: Jun. 8, 2004

(54) DIGITAL HALFTONING METHOD AND APPARATUS, AND ITS COMPUTER READABLE MEDIUM

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 880 days.

(21) Appl. No.: 09/627,404

(22) Filed: Jul. 27, 2000

(30) Foreign Application Priority Data

Jul. 28, 1999 (JP) ............................................ 11-214226
Nov. 12, 1999 (JP) ............................................ 11-322917

(51) Int. Cl.[7] ............................................... G06K 15/00

(52) U.S. Cl. ...................... 358/1.9; 358/3.06; 382/237; 382/260

(58) Field of Search ................................. 358/1.9, 3.01, 358/3.06, 534; 382/232, 237, 260, 263, 264, 265

(56) References Cited

U.S. PATENT DOCUMENTS 5,469,268 A * 11/1995 Neuhoff et al. ............. 358/3.27
5,539,842 A *  7/1996 Schwartz .................... 382/232
6,041,138 A    3/2000 Nishida

FOREIGN PATENT DOCUMENTS

JP          5-91331      4/1993

* cited by examiner

*Primary Examiner*—Thomas D. Lee
(74) *Attorney, Agent, or Firm*—Oblon, Spivak, McClelland, Maier & Neustadt, P.C.

(57) ABSTRACT

In a digital halftoning method and apparatus of the invention, a visual-quality control filter is provided based on computation of a quantity of local features of neighboring pixels for each of respective pixels of a gray-scale image, the visual-quality control filter adaptively controlling visual characteristics for each of respective pixels of an image input to the filter. An initial halftone image is generated from the gray-scale image. The gray-scale image is processed through the visual-quality control filter to output a processed gray-scale image with the controlled visual characteristics. The initial halftone image is processed through the visual-quality control filter to output a processed initial halftone image with the controlled visual characteristics. A sum of squares of local visual-quality errors between the processed gray-scale image and a processed halftone image is computed, wherein the computation is started by taking the processed initial halftone image as a first processed halftone image. An output halftone image is generated from the initial halftone image through a repeated computation such that the sum of the squares of the local visual-quality errors obtained for the gray-scale image and the initial halftone image is reduced to a smaller value obtained for the gray-scale image and the output halftone image.

14 Claims, 14 Drawing Sheets

| 0 | 0 | 0 | 0 | 0 | 0 | 0 |
|---|---|---|---|---|---|---|
| 0 | 0 | 1 | 0 | 0 | 0 | 0 |
| 0 | 1 | 0 | 1 | 0 | 1 | 0 |
| 0 | 0 | 0 | 0 | 0 | 0 | 0 |

FIG. 8

(a) EYE-TO-PAPER
DISTANCE : 0mm

| 0.000 | 0.000 | 0.000 | 0.000 | 0.000 |
|---|---|---|---|---|
| 0.000 | 0.000 | 0.000 | 0.000 | 0.000 |
| 0.000 | 0.000 | 1.000 | 0.000 | 0.000 |
| 0.000 | 0.000 | 0.000 | 0.000 | 0.000 |
| 0.000 | 0.000 | 0.000 | 0.000 | 0.000 |

(b) EYE-TO-PAPER
DISTANCE : 50mm

| 0.000 | 0.004 | 0.000 | 0.004 | 0.008 |
|---|---|---|---|---|
| 0.004 | -0.026 | -0.028 | -0.026 | 0.004 |
| 0.000 | -0.028 | 1.154 | -0.028 | 0.000 |
| 0.004 | -0.026 | -0.028 | -0.026 | 0.004 |
| 0.000 | 0.004 | 0.000 | 0.004 | 0.008 |

(c) EYE-TO-PAPER
DISTANCE : 100mm

| 0.015 | 0.007 | 0.005 | 0.007 | 0.015 |
|---|---|---|---|---|
| 0.007 | 0.033 | -0.023 | 0.033 | 0.007 |
| 0.005 | -0.023 | 0.821 | -0.023 | 0.005 |
| 0.007 | 0.033 | -0.023 | 0.033 | 0.007 |
| 0.015 | 0.007 | 0.005 | 0.007 | 0.015 |

(d) EYE-TO-PAPER
DISTANCE : 150mm

| 0.010 | 0.005 | 0.001 | 0.005 | 0.010 |
|---|---|---|---|---|
| 0.005 | 0.081 | 0.038 | 0.081 | 0.005 |
| 0.001 | -0.038 | 0.443 | 0.038 | 0.001 |
| 0.005 | 0.081 | 0.038 | 0.081 | 0.005 |
| 0.010 | 0.005 | 0.001 | 0.005 | 0.010 |

(e) EYE-TO-PAPER
DISTANCE : 200mm

| 0.012 | 0.009 | 0.004 | 0.009 | 0.012 |
|---|---|---|---|---|
| 0.009 | 0.087 | 0.064 | 0.087 | 0.009 |
| 0.004 | 0.064 | 0.261 | 0.064 | 0.004 |
| 0.009 | 0.087 | 0.064 | 0.087 | 0.009 |
| 0.012 | 0.009 | 0.004 | 0.009 | 0.012 |

(f) EYE-TO-PAPER
DISTANCE : 250mm

| 0.016 | 0.016 | 0.010 | 0.016 | 0.016 |
|---|---|---|---|---|
| 0.016 | 0.080 | 0.069 | 0.080 | 0.016 |
| 0.010 | 0.069 | 0.175 | 0.069 | 0.010 |
| 0.016 | 0.080 | 0.069 | 0.080 | 0.016 |
| 0.016 | 0.016 | 0.010 | 0.016 | 0.016 |

(g) EYE-TO-PAPER
DISTANCE : 300mm

| 0.021 | 0.021 | 0.015 | 0.021 | 0.021 |
|---|---|---|---|---|
| 0.021 | 0.073 | 0.067 | 0.073 | 0.021 |
| 0.015 | 0.067 | 0.129 | 0.067 | 0.015 |
| 0.021 | 0.073 | 0.067 | 0.073 | 0.021 |
| 0.021 | 0.021 | 0.015 | 0.021 | 0.021 |

DIGITAL HALFTONING METHOD AND APPARATUS, AND ITS COMPUTER READABLE MEDIUM

BACKGROUND OF THE INVENTION

1. Field of The Invention

The present invention generally relates to image compression techniques, and more particularly to a digital halftoning method in which a gray-scale image is compressed into a halftone image with a limited number of gray levels. The digital halftoning is an important technique that is applied to processed images or images being processed when visualizing such images by using an output device, such as a display or a printer.

Further, the present invention relates to a digital halftoning apparatus which carries out digital halftoning processing. The present invention relates to a computer readable medium storing program code instructions which cause a processor to execute digital halftoning processing.

2. Description of The Related Art

Digital halftoning used in imaging systems is known as a technique for generating the pixel patterns with a limited number of gray levels or colors. For example, two gray levels are used to generate a bilevel image, eight colors are used to generate a RGB color image, and 16 colors are used to generate a CMYK color image. As the approach for digital halftoning of this type, various conventional methods, such as the thresholding method, the dithering method or the error diffusion method, have been developed.

Recently, the ability of data processing and computation in microprocessors and digital signal processors has remarkably been increased, and attention is being given to model-based digital halftoning.

As disclosed in Japanese Laid-Open Patent Application No.5-91331, a few digital halftoning techniques are known. These techniques may be categorized into a first scheme for digital halftoning based on a human visual model, and a second scheme for digital halftoning based on a printer characteristic model. The human visual model used by the first scheme is to represent a digital halftone image with improvement of the quality of the image from the viewpoint of the human vision. The printer characteristic model used by the second scheme is to represent a digital halftone image with improvement of the quality of the image from the viewpoint of the printer output characteristics.

Generally, the human visual model depends upon the resolution of the digital image and upon the eye-to-paper distance between the human eye and the paper. The human visual model may be implemented by using a digital finite impulse response (FIR) filter.

Further, the printer characteristic model is defined with a dot radius of the printer, and it is provided by using a lookup table in which pixel values of the respective pixels corresponding to the digital image are locally arranged so as to be in conformity with the printer output characteristics. In particular, the least square model-based (LSMB) method, which is known as one of the model-based digital halftoning techniques, is characterized by the computation of an optimum halftone image so as to minimize the human visual errors between the original gray-scale image and the printout halftone image.

The advantage of the model-based digital halftoning is that the model parameters are adjusted based on the image and output device characteristics, and the adaptive control of an output image is provided. It is known that the quality of halftone images created by the model-based digital halftoning can be higher than the quality of images created by the screening or the error diffusion method. The model-based digital halftoning will improve the smoothness of the image texture and remarkably reduce the undesired effects, such as the so-called "worm".

On the other hand, some approaches for improvement of the quality of images created by the screening or the error diffusion method have been proposed. In an improved error diffusion method, the smoothness of the image texture is increased by setting, at random, the filter weight coefficients, and the edge sharpening is attained by the modulation of the threshold values.

In the above-mentioned LSMB method, the computation of the optimum halftone image for minimizing the human visual errors requires a fair amount of computations on the microprocessor or the digital signal processor.

In the digital halftoning, the information contained in the original image will be partially lost because the number of gray levels or colors is reduced from that of the original image. However, it is desirable to retain, from the viewpoint of the human vision, the appearance of the original gray-scale image in the resulting halftone image. For this purpose, an improved image coding method that does not cause the loss of the human visual information in the resulting halftone image is demanded. Preferably, the improved image coding method is capable of not only retaining the image features (for example, the image smoothness) but also providing improvement of the image quality from the viewpoint of the human vision.

For example, when the image texture is complicated or there is an abrupt change in the pixel value in the neighborhood of a particular pixel in the original image, the edge sharpening should be provided in the halftone image. This measure is often taken for character or graphics regions of the original image. When the original image contains a smooth region where the pixel value scarcely changes, the moire or other synthetic patterns should be avoided from appearing in the halftone image.

However, in the above-mentioned model-based digital halftoning methods, it is difficult to provide the adaptive control of the quality of the output image even if only one of either the smoothness or the sharpness can be improved. Specifically, it is difficult for the above LSMB method to improve both the smoothness and the sharpness. The use of the FIR filter provides improvement of the smoothness or the sharpness of the entire output image. If the FIR filter is configured to improve the smoothness, the sharpness of the output image will be lost. In a case of a mixed image in which the characters and the graphics coexist, the characters of the output image will be difficult to read. On the other hand, if the FIR filter is configured to improve the sharpness, the moire or other synthetic patterns will appear in the smooth regions of the output image.

Similar problems arise with the other conventional methods. For example, in the improved error diffusion method, the smoothness of the image is increased by setting, at random, the filter weight coefficients, and the edge sharpening is attained by the modulation of the threshold values. However, the method of this type does not use a quantitative parameter model that directly affects the quality of the output image, and it is difficult to control both the smoothness and the sharpness of the output image by adjusting a small number of quantitative parameters.

SUMMARY OF THE INVENTION

An object of the present invention is to provide an improved digital halftoning method and apparatus in which the above-mentioned problems are eliminated.

Another object of the present invention is to provide a model-based digital halftoning method that provides the adaptive control of the human visual quality of the output image by using a visual-quality control filter based on the local features of the original image, including the smoothness and the sharpness, without excessively increasing the amount of computations needed to achieve the digital halftoning.

Another object of the present invention is to provide a model-based digital halftoning apparatus that provides the adaptive control of the human visual quality of the output image by using a visual-quality control filter based on the local features of the original image, including the smoothness and the sharpness, without excessively increasing the amount of computations needed to achieve the digital halftoning.

Another object of the present invention is to provide a computer readable medium storing program code instructions for causing the computer to execute a model-based digital halftoning processing that provides the adaptive control of the human visual quality of the output image by using a visual-quality control filter based on the local features of the original image, including the smoothness and the sharpness, without excessively increasing the amount-of computations needed to achieve the digital halftoning.

The amount of memory available to the digital halftoning hardware is limited. If the amount of computations needed to achieve the digital halftoning exceeds the amount of memory available, it is impossible for the hardware to carry out the digital halftoning. Still another object of the present invention is to provide a model-based digital halftoning method and apparatus that effectively reduces the amount of computations needed for the digital halftoning.

The above-mentioned objects of the present invention are achieved by a digital halftoning method for compressing a gray-scale image into a halftone image, the halftone image having pixels with a decreased number of gray levels, which includes the steps of: providing a visual-quality control filter based on computation of a quantity of local features of neighboring pixels for each of respective pixels of the gray-scale image, the visual-quality control filter adaptively controlling visual characteristics for each of respective pixels of an image input to the filter; generating an initial halftone image from the gray-scale image; processing the gray-scale image through the visual-quality control filter to output a processed gray-scale image with the controlled visual characteristics; processing the initial halftone image through the visual-quality control filter to output a processed initial halftone image with the controlled visual characteristics; computing a sum of squares of local visual-quality errors between the processed gray-scale image and a processed halftone image, wherein the computation is started by taking the processed initial halftone image as a first processed halftone image; and generating an output halftone image from the initial halftone image through a repeated computation such that the sum of the squares of the local visual-quality errors obtained for the gray-scale image and the initial halftone image is reduced to a smaller value obtained for the gray-scale image and the output halftone image.

The above-mentioned objects of the present invention are achieved by a digital halftoning method for compressing a gray-scale image into a halftone image, the halftone image having pixels with a decreased number of gray levels, which includes the steps of: partitioning the gray-scale image into blocks of pixels of partial overlapping image portions; providing a visual-quality control filter based on computation of a quantity of local features of neighboring pixels for each of the respective blocks of the gray-scale image; processing each of the respective blocks of the gray-scale image through the visual-quality control filter so as to output processed partial overlapping image portions each with the controlled visual quality; generating an initial halftone image portion from each of the respective blocks of the gray-scale image; processing each initial halftone image portion through the visual-quality control filter so as to output processed initial halftone image portions each with the controlled visual quality; computing a sum of squares of local visual-quality errors between the processed gray-scale image and a processed halftone image portion for each block of the gray-scale image, wherein the computation is started by taking the processed initial halftone image portion as a first processed halftone image; generating an output halftone image portion from the initial halftone image portion through a repeated computation, for each block of the gray-scale image, such that the sum of the sequares of the local visual-quality errors obtained for the gray-scale image block and the initial halftone image protion is reduced to a smaller value obtained for the gray-scale image block and the output halftone image portion; and generating an output halftone image by composition of the output halftone image portions obtained for all of the blocks of the gray-scale image.

The above-mentioned objects of the present invention are achieved by a digital halftoning apparatus for compressing a gray-scale image into a halftone image, the halftone image having pixels with a decreased number of gray levels, which includes: an image memory which stores a gray-scale image and a halftone image; an initial halftone image computation unit which generates an initial halftone image from the gray-scale image, and stores the initial halftone image in the image memory; an image feature computation unit which provides computation of a quantity of local features of neighboring pixels for each of respective pixels of the gray-scale image; a visual-quality control filter unit which provides a visual-quality control filter based on the computation of the quantities of local features of the neighboring pixels for the respective pixels of the gray-scale image, the visual-quality control filter adaptively controlling visual characteristics for each of respective pixels of an image input to the filter, so the the controlled visual characteristics of the processed input image are stored in the image memory; and an optimum halftone image computation unit which computes a sum of squares of local visual-quality errors between a processed gray-scale image output by the filter and a processed halftone image output by the filter, the computation being started by taking a processed initial halftone image output by the filter, as a first processed halftone image, and generates an output halftone image from the initial halftone image through a repeated computation such that the sum of the squares of the local visual-quality errors obtained for the gray-scale image and the initial halftone image is reduced to a smaller value obtained for the gray-scale image and the output halftone image.

The above-mentioned objects of the present invention are achieved by a computer readable medium storing program code instructions for causing a processor to execute a digital halftoning processing in which a gray-scale image is compressed into a halftone image, the halftone image having pixels with a decreased number of gray levels, the computer readable medium including: a first program code device which causes the processor to provide computation of a quantity of local features of neighboring pixels for each of respective pixels of the gray-scale image; a second program code device which causes the processor to provide a visual-quality control filter based on the computation of the quantities of local features of the neighboring pixels for the respective pixels of the gray-scale image, the visual-quality control filter adaptively controlling visual characteristics for each of respective pixels of an image input to the filter; a third program code device which causes the processor to generate an initial halftone image from the gray-scale image; a fourth program code device which causes the processor to process the gray-scale image through the visual-quality control filter to output a processed gray-scale image with the controlled visual characteristics; a fifth program code device which causes the processor to process processing the initial halftone image through the visual-quality control filter to output a processed initial halftone image with the controlled visual characteristics; a sixth program code device which causes the processor to compute a sum of squares of local visual-quality errors between a processed gray-scale image output by the filter and a processed halftone image output by the filter, the computation being started by taking a processed initial halftone image output by the filter, as a first processed halftone image; and a seventh program code device which causes the processor to generate an output halftone image from the initial halftone image through a repeated computation such that the sum of the squares of the local visual-quality errors obtained for the gray-scale image and the initial halftone image is reduced to a smaller value obtained for the gray-scale image and the output halftone image.

In the digital halftoning method and apparatus of the present invention, the sum of the squares of the local visual-quality errors between the processed gray-scale image output by the visual-quality control filter and the processed halftone image outptu by the visual-quality control filter, and the output halftone image is generated from the initial halftone image through a repeated computation such that the sum of the squares of the local visual-quality errors obtained for the gray-scale image and the initial halftone image is reduced to a smaller value. The digital halftoning method and apparatus of one preferred embodiment of the invention is effective in providing the adaptive control of the human visual quality of the output haltone image by using the visual-quality control filter based on the local features of the original image, including the smoothness and the sharpness. It is possible to prevent the amount of computations needed for the digital halftoning from being excessively increased.

Further, in the digital halftoning method and apparatus of the present invention, the gray-scale image is partitioned into blocks of pixels of partial overlapping image portions, and the output halftone image is generated by composition of output halftone image portions obtained for all of the blocks of the gray-scale image. The digital halftoning method and apparatus of one preferred embodiment of the invention is effective in reducing the amount of computations needed for the digital halftoning.

BRIEF DESCRIPTION OF THE DRAWINGS

Other objects, features and advantages of the present invention will be apparent from the following detailed description when read in conjunction with the accompanying drawings.

FIG. 8 is a diagram for explaining various two-dimensional digital filters for use in the digital halftoning apparatus of the first preferred embodiment.

DETAILED DESCRIPTION OF PREFERRED EMBODIMENTS

A description will now be provided of preferred embodiments of the present invention with reference to the accompanying drawings.

Figure 1:
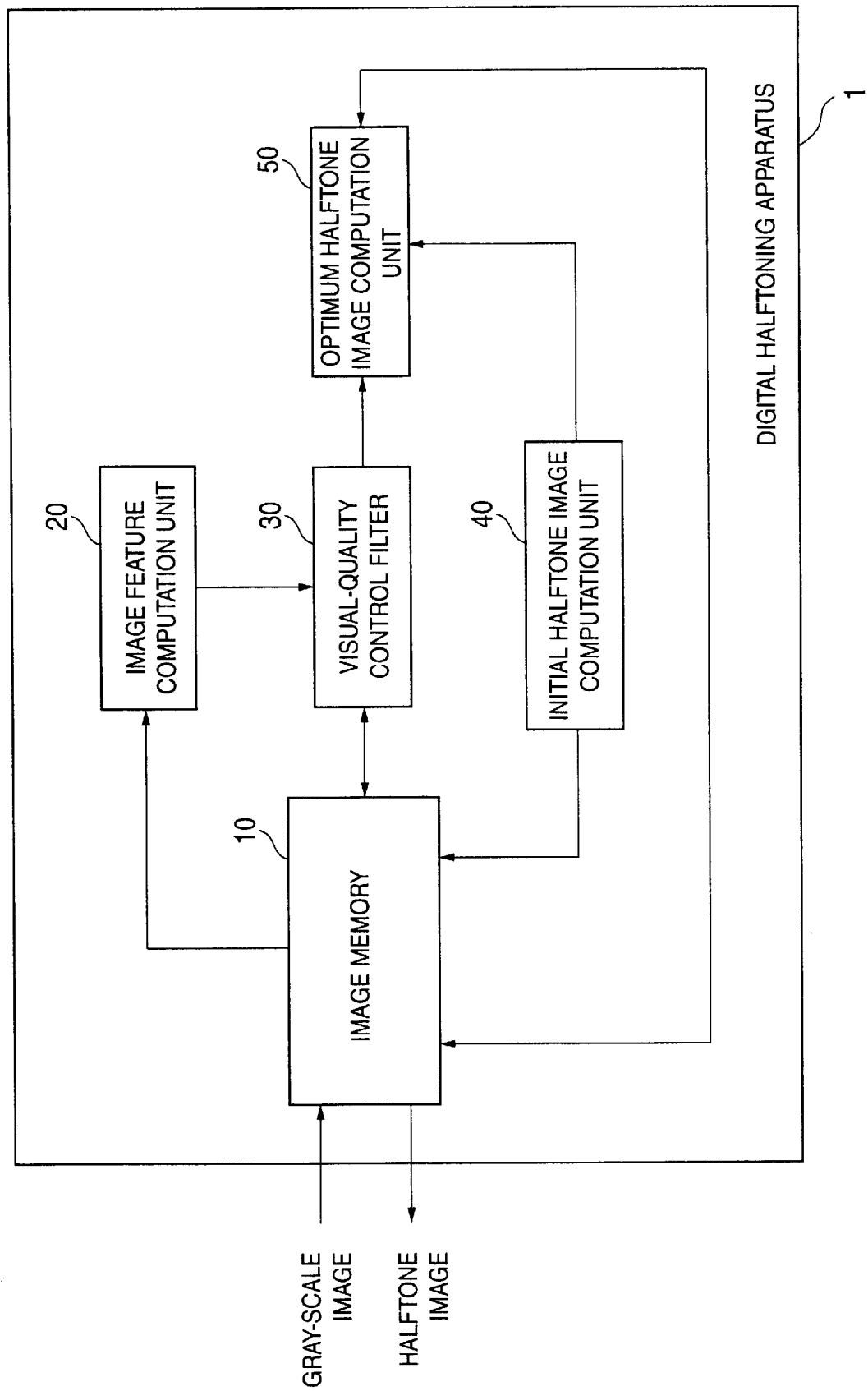
FIG. 1 is a block diagram of a digital halftoning apparatus to which one preferred embodiment of the invention is applied.

FIG. 1 shows a digital halftoning apparatus 1 to which one preferred embodiment of the invention is applied.

The digital halftoning apparatus 1 of the present invention receives a gray-scale image from an input device (not shown), generates a halftone image from the received gray-scale image, the halftone image having a decreased number of gray levels, and supplies the halftone image to an output device (not shown) without causing the loss of the human visual information contained in the gray-scale image. For example, the digital halftoning apparatus 1 is configured so that the digital halftoning apparatus 1 is provided between an image processor or the like and an output device, such as a display or a printer. The digital halftoning apparatus 1 compresses a gray-scale image, processed by the image processor, into a halftone image while retaining the human visual information of the gray-scale image, and supplies the halftone image to the output device.

As shown in FIG. 1, the digital halftoning apparatus 1 generally comprises an image memory 10 and an initial halftone image computation unit 40. The image memory 10 stores a gray-scale image received from an input device (not shown), and a halftone image to be supplied to an output device (not shown). The initial halftone image computation unit 40 generates an initial halftone image through a known halftoning computation of the gray-scale image that is originally stored in the image memory 10, and supplies the initial halftone image to the image memory 10 so that the initial halftone image is temporarily stored in the image memory 10. The initial halftone image has respective pixels with a decreased number of gray levels smaller than the original number of gray levels for each of the respective pixels of the gray-scale image.

The digital halftoning apparatus 1 generally comprises an image feature computation unit 20 and a visual-quality control filter 30. The image feature computation unit 20 provides computation of a quantity of local features of neighboring pixels for each of the respective pixels of the gray-scale image that is stored in the image memory 10. The image feature computation unit 20 provides the visual-quality control filter 30 such that it adaptively controls a visual quality for respective pixels of an input image based on the computation of the quantities of local features of the neighboring pixels for the respective pixels of the orignal gray-scale image.

When the gray-scale image, originally stored in the image memory 10, is processed through the visual-quality control filter 30, the visual-quality control filter 30 outputs a processed gray-scale image having the respective pixels with the controlled visual quality. When the initial halftone image, stored in the image memory 10, is processed through the visual-quality control filter 30, the visual-quality control filter 30 outputs a processed initial halftone image having the respective pixels with the adaptively controlled visual quality.

The digital halftoning apparatus 1 further comprises an optimum halftone image computation unit 50. The optimum halftone image computation unit 50 provides computation of a sum of squares of local visual-quality errors between the processed gray-scale image and a processed halftone image, wherein the computation is started by taking the processed initial halftone image as a first processed halftone image and repeated for determination of an optimum halftone image being output to the output device (for example, a printer). The optimum halftone image computation unit 50 generates an output halftone image from the processed initial halftone image through the repeated computation such that the sum of the sequares of the local visual-quality errors obtained for the processed initial halftone image is reduced to a smaller value. The output halftone image, generated by the optimum halftone image computation unit 50, is supplied to the image memory 10 so that the output halftone image is stored in the image memory 10.

Accordingly, the digital halftoning apparatus 1 of the present invention is effective in providing the adaptive control of the human visual quality of the output image by using the visual-quality control filter based on the local features of the original image, including the smoothness and the sharpness, without excessively increasing the amount of computations needed to achieve the digital halftoning. It is possible to avoid the loss of the visual quality information in the output halftone image while providing the improvement of the smoothness and the sharpness.

Preferably, in the digital halftoning apparatus 1 of the present invention, the visual-quality control filter 30 is implemented in the form of a two-dimensional FIR filter that adaptively controls the visual quality for the respective pixels of an input image based on the computation of the quantities of local features of the original gray-scale image.

Preferably, in the digital halftoning apparatus 1 of the present invention, the image feature computation unit 20 includes a means for providing computation of a gradient of pixel values of neighboring pixels for each of the respective pixels of the original gray-scale image as the computation of the quantities of local features. The visual-quality control filter 30 includes a means for adaptively controlling the visual characteristics for the respective pixels of the input image, including the smoothness and the sharpness, based on the computation of the gradients of the original image.

Preferably, in the digital halftoning apparatus 1 of the present invention, the optimum halftone image computation unit 50 includes a means for providing computation of the sum of the squares of the local visual-quality errors between the processed gray-scale image and the processed halftone image, wherein the computation is started by taking the processed initial halftone image as the first processed halftone image and repeated for determination of an optimum halftone image being output to the output device. The optimum halftone image computation unit 50 further includes a means for generating the output halftone image from the processed initial halftone image through the repeated computation such that the sum of the squares of the local visual-quality errors obtained for the processed initial halftone image is reduced to a smaller value. The optimum halftone image computation unit 50 further includes a means for terminating the repeated computation of the sum of the squares of the local visual-quality errors when a convergence of the sum of the squares of the local visual-quality errors is detected.

Preferably, in the digital halftoning apparatus 1 of the present invention, the optimum halftone image computation unit 50 includes a means for providing, prior to the computation of the sum of the squares of the local visual-quality errors, approximation of internsity distortions of the output halftone image caused by the output characteristics of the output device, for the generation of the output halftone image.

Figure 2:
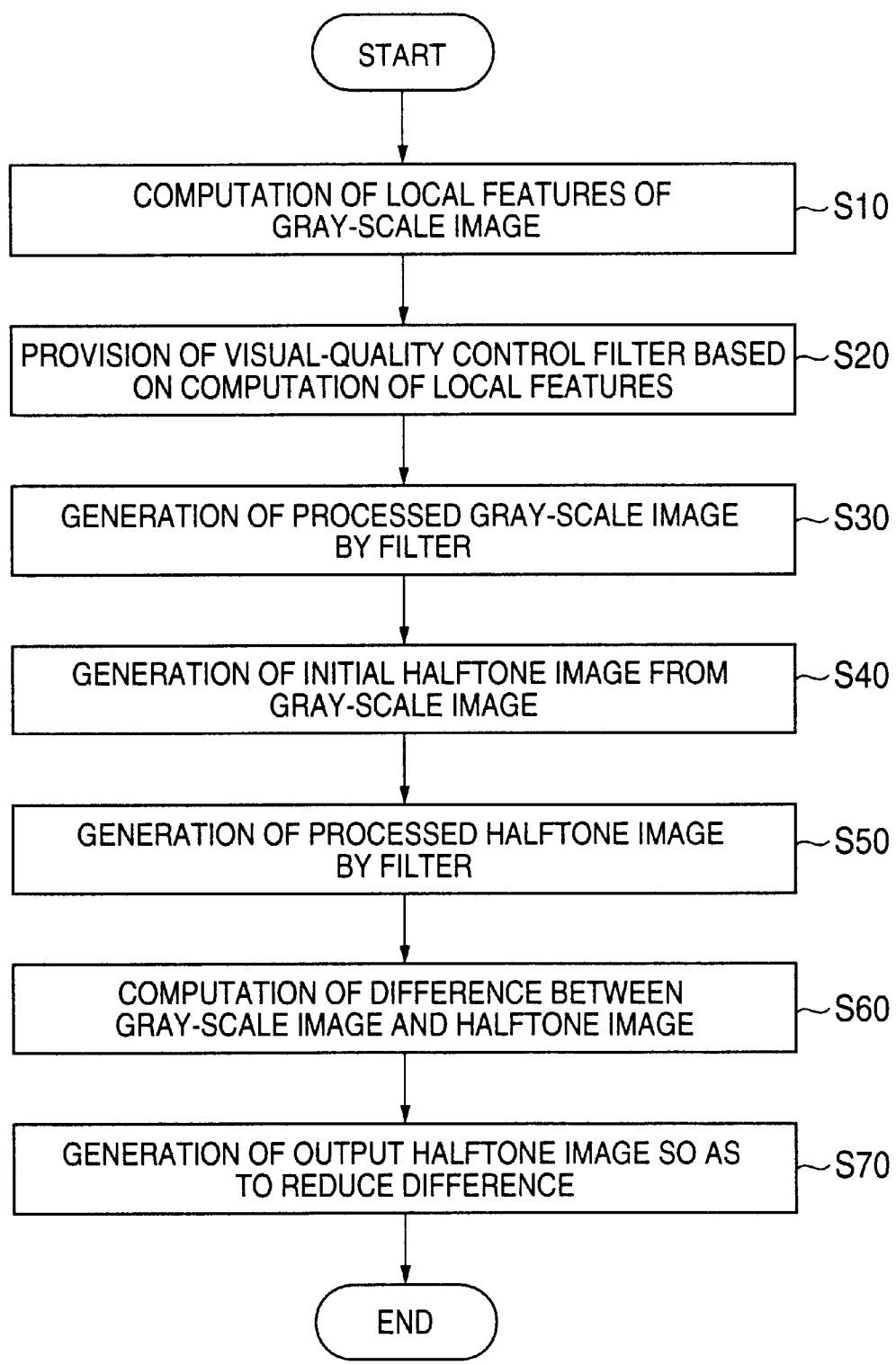
FIG. 2 is a flowchart for explaining a control process executed by one preferred embodiment of the digital halftoning apparatus of the invention.

FIG. 2 is a flowchart for explaining a control process executed by the digital halftoning apparatus 1 of FIG. 1. The digital halftoning apparatus 1 of the present invention includes a central processing unit (CPU) which executes the control process in the flowchart of FIG. 2, although the indication of the CPU in the digital halftoning apparatus of FIG. 1 is omitted for the sake of convenience of description. In the digital halftoning apparatus 1 of the present invention, a computer readable medium is provided for storing program code instructions that cause the CPU to execute the control process. The image feature computation unit 20, the initial halftone image computation unit 40 and the optimum halftone image computation unit 50 in the digital halftoning apparatus 1 of the present invention may be configured into the program code instructions stored in the computer readable medium.

As shown in FIG. 2, at a start of the execution of the control process, the image feature computation unit 20 causes the CPU to compute the quantities of local features of the neighboring pixels for the respective pixels of the gray-scale image that is stored in the image memory 10 (step S10).

The image feature computation unit 20 causes the CPU to provide the visual-quality control filter 30 such that it adaptively controls the visual quality for the respective pixels of an input image based on the computation of the quantities of local features of the neighboring pixels for the respective pixels of the original gray-scale image (step S20).

Further, the program code instructions causes the CPU to process the gray-scale image through the visual-quality control filter 30 so that the visual-quality control filter 30 outputs a processed gray-scale image having the respective pixels with the controlled visual quality (step S30). The processed gray-scale image is also stored in the image memory 10.

On the other hand, the initial halftone image computation unit 40 causes the CPU to generate the initial halftone image through the known halftoning computation of the gray-scale image, so that the initial halftone image is stored in the image memory 10 (step S40).

The program code instructions causes the CPU to process the initial halftone image, stored in the image memory 10, through the visual-quality control filter 30, so that the visual-quality control filter 30 outputs a processed initial halftone image having the respective pixels with the controlled visual quality (step S50). The processed intial halftone image is also stored in the image memory 10.

The optimum halftone image computation unit 50 causes the CPU to compute the sum of the squares of the local visual-quality errors between the processed gray-scale image and a processed halftone image, wherein the computation is started by taking the processed initial halftone image as a first processed halftone image and repeated for determination of an optimum halftone image being output to the output device (step S60). Herein, the sum of the squares of the local visual-quality errors between the processed gray-scale image and the processed halftone image will be called the difference between the gray-scale image and the halftone image.

The optimum halftone image computation unit 50 causes the CPU to generate an output halftone image from the initial halftone image through the repeated computation such that the sum of the sequares of the local visual-quality errors obtained for the gray-scale image and the initial halftone image is reduced to a smaller value obtained for the gray-scale image and the output halftone image (step S70).

In the above-described control process of FIG. 2, the step S50 generates the initial halftone image after the step S40 in which the visual-quality controlled gray-scale image is generated. The present invention is not limited to this embodiment. What is needed for this processing is that the step S50 precedes the step S60. Alternatively, the step S50 may be executed immediately after the execution of the step S20.

Figure 3:
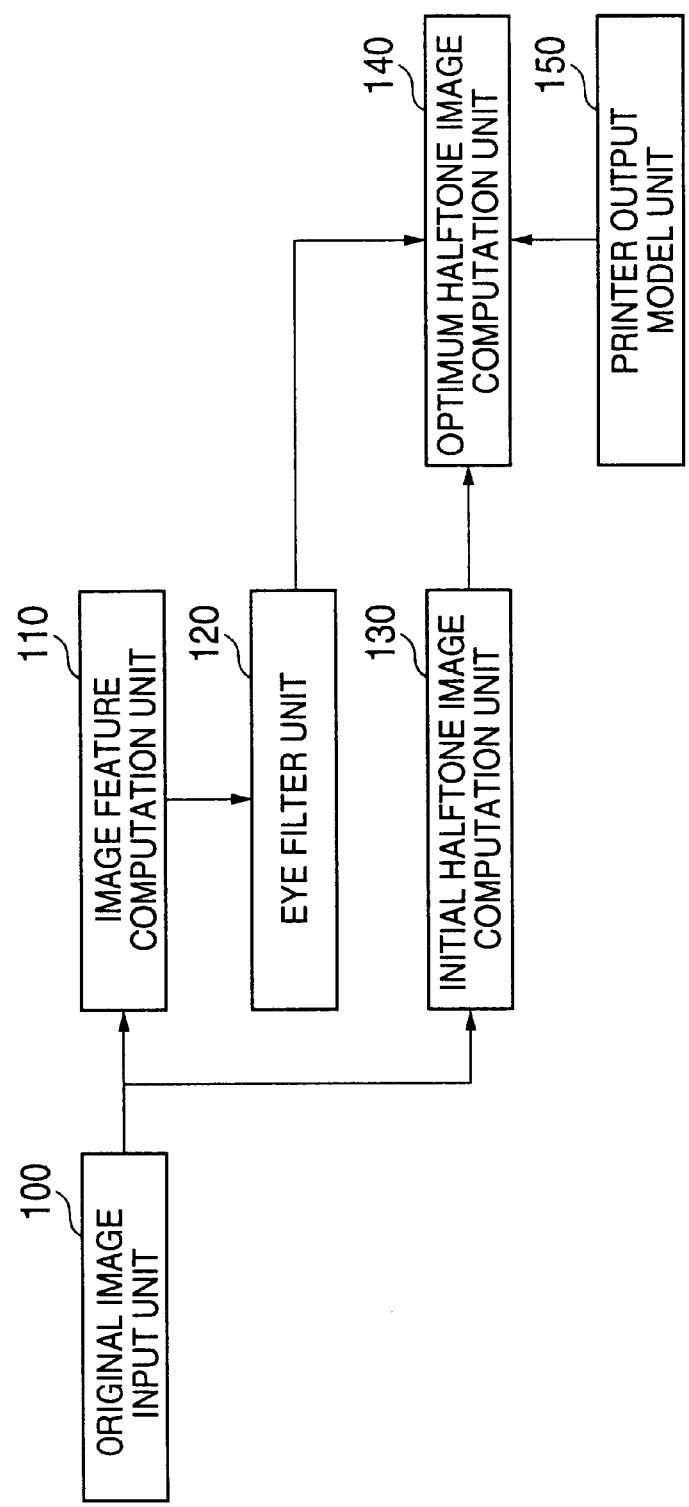
FIG. 3 is a functional block diagram of a first preferred embodiment of the digital halftoning apparatus of the invention.

A description will now be provided of an operation of a first preferred embodiment of the digital halftoning apparatus of the invention with reference to FIG. 3. FIG. 3 is a functional block diagram of the first preferred embodiment of the digital halftoning apparatus.

In the present embodiment, a printer is taken as the output device to which the halftone image output by the digital halftoning apparatus is transmitted, and the digital halftoning apparatus of the present embodiment is configured by considering the printer output model for the printer when executing the digital halftoning.

As shown in FIG. 3, the digital halftoning apparatus of the present embodiment generally comprises an original image input unit 100, an image feature computation (IFC) unit 110, an eye filter unit 120, an initial halftone image computation (IHIC) unit 130, an optimum halftone image computation (OHIC) unit 140, and a printer output model unit 150.

The original image input unit 100 supplies a gray-scale image (for example, a continuous tone image) to both the image feature computation (IFC) unit 110 and the initial halftone image computation (IHIC) unit 130.

The IFC unit 110 provides computation of a quantity of local features of neighboring pixels for each of the respective pixels of the original gray-scale image. The IFC unit 110 supplies the quantities of local features of the respective pixels of the original gray-scale image to the eye filter unit 120.

The eye filter unit 120 includes a linear FIR filter that provides computation of visual characteristics of the processed image in the frequency domain based on the quantities of local features of the respective pixels of the original image supplied by the IFC unit 110. The FIR filter is configured as a function that depends on the resolution of the input digital image and the magnitude of the eye-to-paper distance (or, the distance from the human viewer's eye and the plane where the digital image is printed on paper or displayed on the display monitor). Herein, the FIR filter of the eye filter unit 120 is also called the eye filter.

In the eye filter unit 120, the FIR filter is provided based on now the computation of the quantities of local features of the neighboring pixels for the respective pixels of the gray-scale image supplied by the IFC unit 110, the FIR filter adaptively controlling the visual characteristics for each of respective pixels of the input image. The gray-scale image supplied by the original image input unit 100 is processed through the FIR filter to output a processed gray-scale image with the controlled visual characteristics. The eye filter unit 120 supplies the controlled visual characteristics of the gray-scale image to the OHIC unit 140.

The IHIC unit 130 generates an initial halftone image from the original gray-scale image by using a known halftoning technique, such as the bilevel rendition or error diffusion method using dithering or thresholding processes. The initial halftone image output by the IHIC unit 130 is processed through the FIR filter of the eye filter unit 120 to output a processed initial halftone image with the controlled visual characteristics, and the controlled visual characteristics are supplied to the OHIC unit 140.

The OHIC unit 140 computes a sum of squares of local visual-quality errors between the processed gray-scale image output by the FIR filter and a processed halftone image output by the FIR filter, wherein the computation is started by taking the processed initial halftone image as a first one of the processed halftone image.

Further, the OHIC unit 140 generates an output halftone image from the initial halftone image through a repeated computation such that the sum of the squares of the local visual-quality errors, which is obtained for the gray-scale image and the initial halftone image, is reduced to a smaller value obtained for the gray-scale image and the output halftone image.

The printer output model unit 150 provides, prior to the computation of the sum of the squares of the local visual-quality errors, approximation of intensity distortions of an output halftone image caused by the printer dot gain, for the generation of the output halftone image. In the present embodiment, the printer output model unit 150 is configured with a lookup table which correlates any of 512 bit patterns for each region of 3×3 pixels with an appropriate printing intensity of the center pixel of a corresponding region in the output halftone image.

More specifically, the IFC unit 110 calculates the quantities of local features of the neighboring pixels for the individual pixels of the original gray-scale image. In the present embodiment, the quantity of edge enhancement for each of the individual pixels is taken as the quantity of local features being calculated. By using a known method using the absolute value of the Sobel operator or the Laplacian operator, the quantity of edge enhancement for each pixel of the original image may be calculated. Suppose that (x, y) denotes a particular one of the pixels of the original image, and the quantity of local features for the pixel (x, y) is represented by Cxy. In the present embodiment, the quantity of the local features Cxy is calculated by the IFC unit 110 such that it has a normalized value that satisfies the condition: $0 \leq Cxy \leq 1$.

The eye filter unit 120 in the present embodiment is configured as follows. The human vision acts as a filter having low-frequency characteristics in the spatial resolution. The human viewer's eye is more sensitive to high frequencies in vertical and horizontal directions than in slanting directions. Various modulation transfer functions (MTF) for the representation of the spatial frequency characteristics of the human eye have been proposed. The eye filter of the eye filter unit 120 in the present embodiment is configured based on a representative one of those modulation transfer functions, namely the Daly's modulation transfer function (MTF).

The Daly's modulation transfer function (MTF) is represented by the following formula.

$$V_{if} \equiv \begin{cases} 2.6(0.0192 + 0.144 f_{ij}) \exp\{-(0.144 f_{ij})^{1.1}\} \equiv w(f_{ij}) f_{ij} \geq f_{\max} \\ 1.0 \quad \text{else} \end{cases}$$

In the above formula, "$f_{ij}$" denotes the spatial frequency (in cycles per degree), and "$f_{max}$" denotes the value of f when the function w(f) takes a maximum value. In a case of digital images, the spatial frequency $f_{ig}$ is represented as follows.

$$f_{ij} = \frac{\pi}{180} \cdot \frac{1}{\arcsin[1/\sqrt{1+d^2}]} \cdot \frac{\sqrt{(i-1)^2 + (j-1)^2}}{N\Delta}, i, j = 1, 2, K, N$$

In the above formula, "d" denotes the eye-to-paper distance (in mm), "Δ" denotes the interval of image sampling (in mm), and "N" denotes an integer that determines the quantification of frequencies. Further, taking the dependency of the MTF on the directional spatial frequency into consideration, the scaling of the spatial frequency $f_{ig}$ is performed as follows.

$$f_{ij} \rightarrow f_{ij}/s(\theta_{ij}), \quad \theta_{ij} = \arctan\left(\frac{i-1}{j-1}\right), \quad s(\theta_{ij}) = \left(\frac{1-\omega}{2}\right)\cos(4\theta_{ij}) + \left(\frac{1+\omega}{2}\right)$$

In the above formulas, the parameter ω is set at 0.7. The function "s ($\theta_{ij}$)" takes the maximum value one when the angle $\theta_{ij}$ satisfies the condition: $\theta_{ij} = \kappa\pi/2$ (k=0, 1, 2, 3), and takes the minimum value ω when $\theta_{ij} = \kappa\pi/2 + \pi/4$ (κ=0, 1, 2, 3).

In the present embodiment, the printer output model unit 150 uses a circular dot overlap model, which provides a primary approximation of intensity distortions of the output halftone image caused by the printer dot gain.

Figures 4, 5:
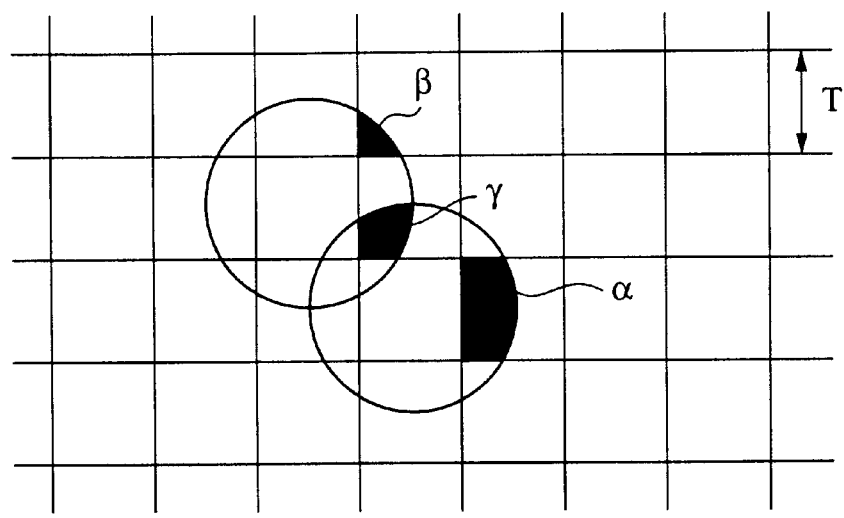
FIG. 4 is a diagram showing an example of a printer output model for use in the digital halftoning apparatus of the first preferred embodiment.
FIG. 5 is a diagram showing an example of a bilevel image data.

FIG. 4 shows an example of a printer output model for use in the digital halftoning apparatus of the present embodiment. FIG. 5 shows an example of a bilevel image data.

In the printer output model of FIG. 4, the two dots are overlapped to a certain degree and each dot is a circle with a given diameter. Generally, in digital image processing, it is often assumed that an image is a collection of rectangular blocks of pixels that are arrayed in an orthogonal grid pattern. The dots that are output by the printer ideally have a circular shape. If the dots are of a circular shape and the dot pitch, equal to the length of the grid interval, is represented by "T", then it is needed that each of black pixels in a region of the image is fully covered with the dots. To meet this requirement, the diameter of each dot has to be above √2 times the dot pitch T. The diameter of each dot significantly depends on the printer dot gain, and the print out image, which is actually printed by the printer, differs from the image as a collection of rectangular blocks of pixels.

In the present embodiment, the printer output model unit 150 includes the printer output model that provides the approximation of the intensity distortions of the output halftone image caused by the printer dot gain. By using the approximation of the intensity distortions for the digital halftoning, it is possible to make the printer to create an output halftone image that is as close to the original gray-scale image as possible.

In the present embodiment, the printer output model is configured as follows. First, suppose that an intensity of a pixel (i, j) of a digital bilevel image B is represented by "$b_{ij}$". The digital bilevel image B is the input to the printer output model. According to this definition, "$b_{ij}=1$" means that a black dot is placed on a sheet of paper at a position that lies "iT" mm apart from the top of the sheet and "jT" mm apart from the left side edge of the sheet, and "$b_{ij}=0$" means that no black dot is placed on the sheet at the position that lies "iT" mm apart from the top of the sheet and "jT" mm apart from the left-side edge of the sheet.

Further, suppose that an intensity of a pixel (i, j) of an output halftone image P[B] is represented by "$p_{ij}$". The output halftone image P[B] is the output from the printer output model. Suppose that the intensity $p_{ij}$ of a pixel of the output halftone image P[B] is a function of a bit pattern $W_{ij}$ consisting of the intensities of the pixel and its eight neighboring pixels in the digital bilevel image B. According to this definition, the following formula can be derived.

$$p_{i,j} = P[B](i, j) = P[W_{i,j}](i, j) = \begin{cases} 1 & \text{if } b_{i,j} = 1 \\ f_1\alpha + f_2\beta - f_3\gamma & \text{if } b_{i,j} = 0 \end{cases}$$

In the above formula, the bit pattern $W_{ij}$ is represented as follows.

$$W_{i,j} = \begin{bmatrix} b_{nw} & b_n & b_{ns} \\ b_w & b_{i,j} & b_e \\ b_{sw} & b_s & b_{se} \end{bmatrix}$$

In the above formula, "$f_1$" denotes the number of black pixels that are adjacent to the central pixel of the block $W_{ij}$ and located on the "north", "east", "south" or "west" side of the center pixel. Namely, $$f_1 = b_n + b_e + b_s + b_w.$$

In the above formula, "$f_2$" denotes the number of black pixels that are adjacent to the central pixel of the block $W_{ij}$ in the diagonal directions wherein there is no adjacent black pixel on the "north", "east", "south" or "west" side of those black pixels. Namely, $$f_2=(b_{nw}=1\&b_n=0\&b_w=0)+(b_{ws}=1\&b_w=0\&b_s=0)+(b_{se}=1\&b_s=0\&b_e=0)+(b_{en}=1\&b_e=0\&b_n=0).$$

Further, in the above formula, "$f_3$" denotes the number of black pixels that are adjacent to the central pixel of the block $W_{ij}$ and located on the "north" or "south" side of the central pixel as well as on the "east" or "west" side of the central pixel. Namely, $$f_3=(b_n=1\&b_w=1)+(b_w=1\&b_s=1)+(b_s=1\&b_e=1)+(b_e=1\&b_n=1).$$

Suppose that "r" denotes the radius of the dot. The ratio "ρ" of the dot radius to the ideal dot radius (or the minimum dot radius that fully covers the black region) is represented as follows.

$$\rho = \frac{r}{T/\sqrt{2}} \quad (1 < \rho \leq \sqrt{2})$$

In the above formula, the three parameters "α", "β" and "γ" of the printer output model are respectively calculated as follows.

$$\alpha = \frac{1}{4}\sqrt{2\rho^2-1} + \frac{\rho^2}{2}\sin^{-1}\left(\frac{1}{\sqrt{2}\rho}\right) - \frac{1}{2}$$

$$\beta = \frac{\pi\rho^2}{8} - \frac{\rho^2}{2}\sin^{-1}\left(\frac{1}{\sqrt{2}\rho}\right) - \frac{1}{4}\sqrt{2\rho^2-1} + \frac{1}{4}$$

$$\gamma = \frac{\rho^2}{2}\sin^{-1}\left(\sqrt{\frac{\rho^2-1}{\rho^2}}\right) - \frac{1}{2}\sqrt{\rho^2-1} - \beta$$

For example, when ρ=1.25, the parameters of the printer output model are calculated as α=0.33, β=0.029 and γ=0.098.

Figure 6:
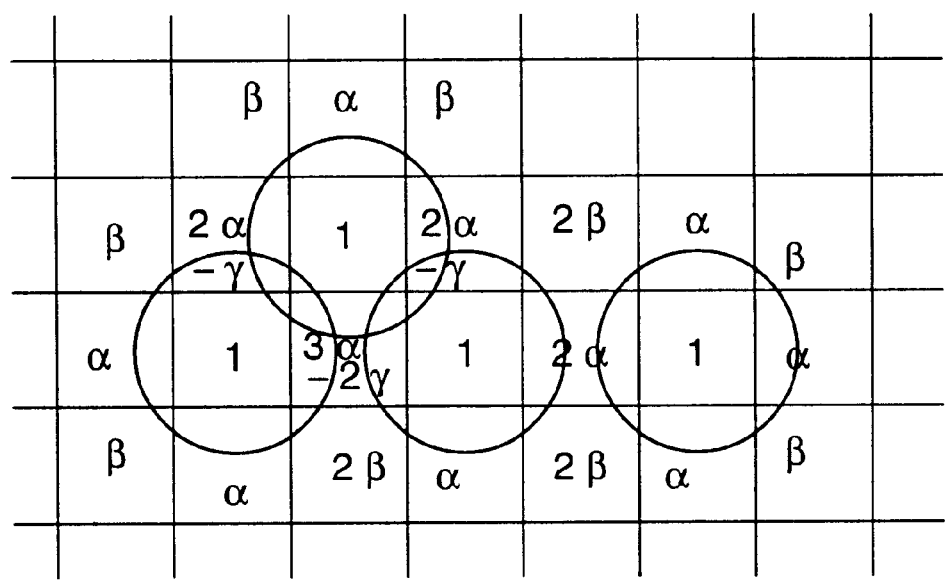
FIG. 6 is a diagram shows a simulation result of an output image when applying the printer output model of FIG. 4 to the bilevel image data of FIG. 5.

FIG. 6 show a simulation result of an output image when the printer output model of FIG. 4 is applied to the bilevel image data of FIG. 5. In the present embodiment, the printer output model unit 150 is configured in the form of a lookup table which correlates any of 512 bit patterns for a region of 3×3 pixels with an appropriate printing intensity of the center pixel of the region in the output halftone image.

Next, a description will be provided of the optimum halftone image computation (OHIC) unit 140 in the present embodiment.

Specifically, the OHIC unit 140 in the present embodiment is configured into the least square model which uses the output of the printer output model and the output of the eye filter when generating an output halftone image.

Figure 7:
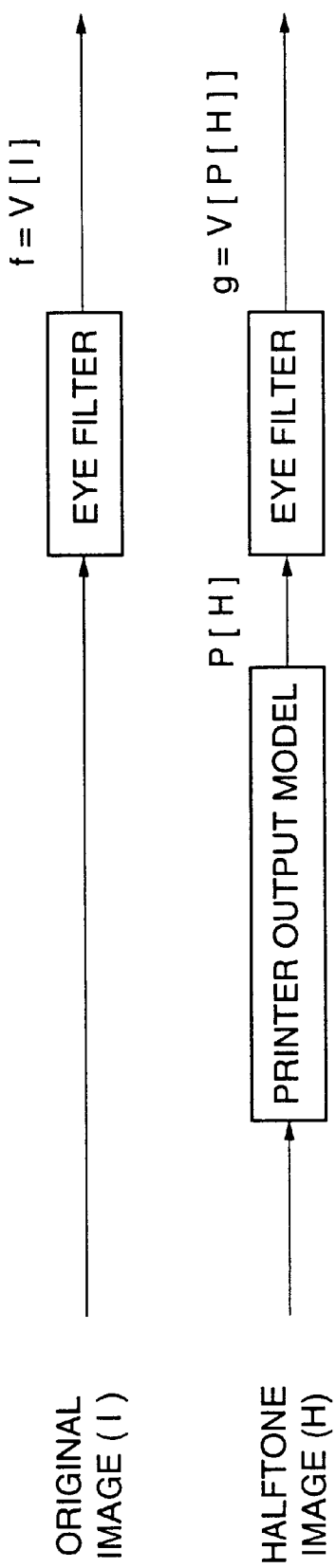
FIG. 7 is a diagram for explaining a reference model used by an optimum halftone image computation unit in the digital halftoning apparatus of the first preferred embodiment.

FIG. 7 shows a reference model which is used by the OHIC unit 140 in the present embodiment which generates an optimum halftone image.

As shown in FIG. 7, "f" denotes a processed gray-scale image output by the eye filter when processing the original gray-scale image "I", and "g" denotes a processed halftone image output by the eye filter when processing the output "P" of the printer output model for the halftone image "H". The processed gray-scale image "f" and the processed halftone image "g" are represented by $$f(x,y) = \sum_{m=-M}^{M}\sum_{n=-M}^{M} I(x-m, y-n)v_{xy}(m,n)$$

$$g(x,y) = \sum_{m=-M}^{M}\sum_{n=-M}^{M} H(x-m, y-n)v_{xy}(m,n)$$

In the above formulas, when "M" denotes an integer, "$v_{xy}(x,y)$" is an impulse response of the eye filter which is implemented in the form of a two-dimensional digital FIR filter with a size (2M+1)*(2M+1). The filter parameters of the eye filter are determined based on the quantities of the local features Cxy for the respective pixels (x, y) of the original gray-scale image.

In the reference model of FIG. 7, "P[H]" denotes a halftone image output by the printer output model. "P[H] (x, y)" denotes an intensity of the pixel (x, y) of the halftone image with the approximated intensity distortions.

The sum "E" of the squares of the local visual-quality errors between the processed gray-scale image "f" output by the eye filter and the processed halftone image "g" output by the eye filter, computed by the OHIC unit 140, is represented by $$E = \sum_{x=0}^{X-1}\sum_{y=0}^{Y-1} e(x,y)^2 \quad (1)$$

In the above formula (1), "X" denotes a size of the image "f" and "Y" denotes a size of the image "g". "e(x, y)" denotes a local visual-quality error between the image "f" and the image "g" at the pixel (x, y), which is represented by $$e(x,y)=g(x,y)-f(x,y) \quad (2)$$

It should be noted that the eye filter adaptively controls the visual characteristics for each of respective pixels of an input image in accordance with the local features of the neighboring pixels for the respective pixels of the input image. If the eye filter is configured to have high-frequency characteristics (or when the eye-to-paper distance is small), the sharpness of the processed halftone image will be enhanced. If the eye filter is configured to have low-frequency characteristics (or when the eye-to-paper distance is large), the high-frequency componenets are eliminated and the smoothness of the processed halftone image will be enhanced.

The eye filter in the present embodiment is not provided to uniformly control the visual characteristics of the entire input image. The eye filter in the present embodiment is configured to adaptively controls the visual characteristics for each of the respective pixels of the input image by varying the frequency characteristics in accordance with the local features of the neighboring pixels for the respective pixels of the input image.

Suppose that "$d_{xy}$" denotes the eye-to-paper distance of the eye filter at the pixel (x, y) in the present embodiment. For example, the eye-to-paper distance "$d_{xy}$" is represented by a monotonic decreasing function of the quantity of the local features "$C_{xy}$" supplied by the IFC unit 110, as follows.

$$d_{xy}=A(1-C_{xy})^a \quad (3)$$

In the above formula (3), "A" denotes a maximum value of the measure of the smoothness. As is apparent from the above formula (3), the sharpness of the processed halftone image will be enhanced as the parameter "a" becomes large.

FIG. 8 shows various two-dimensional digital filters which are implemented as the eye filter with the 5×5 size for use in the digital halftoning apparatus of the first preferred embodiment.

In the digital filters indicated by (a) through (g) in FIG. 8, the resolution is fixed to 400 dpi, and the eye-to-paper distance of the eye filter is varied from 0 mm to 300 mm. The eye-to-paper distance of the eye filter in the present embodiment is determined by converting the local features $C_{xy}$ into the eye-to-paper distance $d_{xy}$ in accordance with the above formula (3).

In the above-described embodiment, it is desirable that the OHIC unit 140 generates an optimum output halftone image in an iterative manner such that the sum E of the squares of the local visual-quality errors between the processed gray-scale image and the processed halftone image is minimized, the computation of the difference being started with the initial halftone image supplied by the IHIC unit 130.

However, the minimization of the sum E requires a fair amount of computations, which will be impractical. To provide cost-effectiveness, the OHIC unit 140 of the present embodiment is configured by using a heuristic algorithm that allows the OHIC unit 40 to generate a near-optimum output halftone image. Hence, the OHIC unit 140 of the present embodiment generates an output halftone image from the initial halftone image through a repeated computation such that the sum of the squares of the local visual-quality errors, which is obtained for the gray-scale image and the initial halftone image, is reduced to a smaller value.

Figure 9:
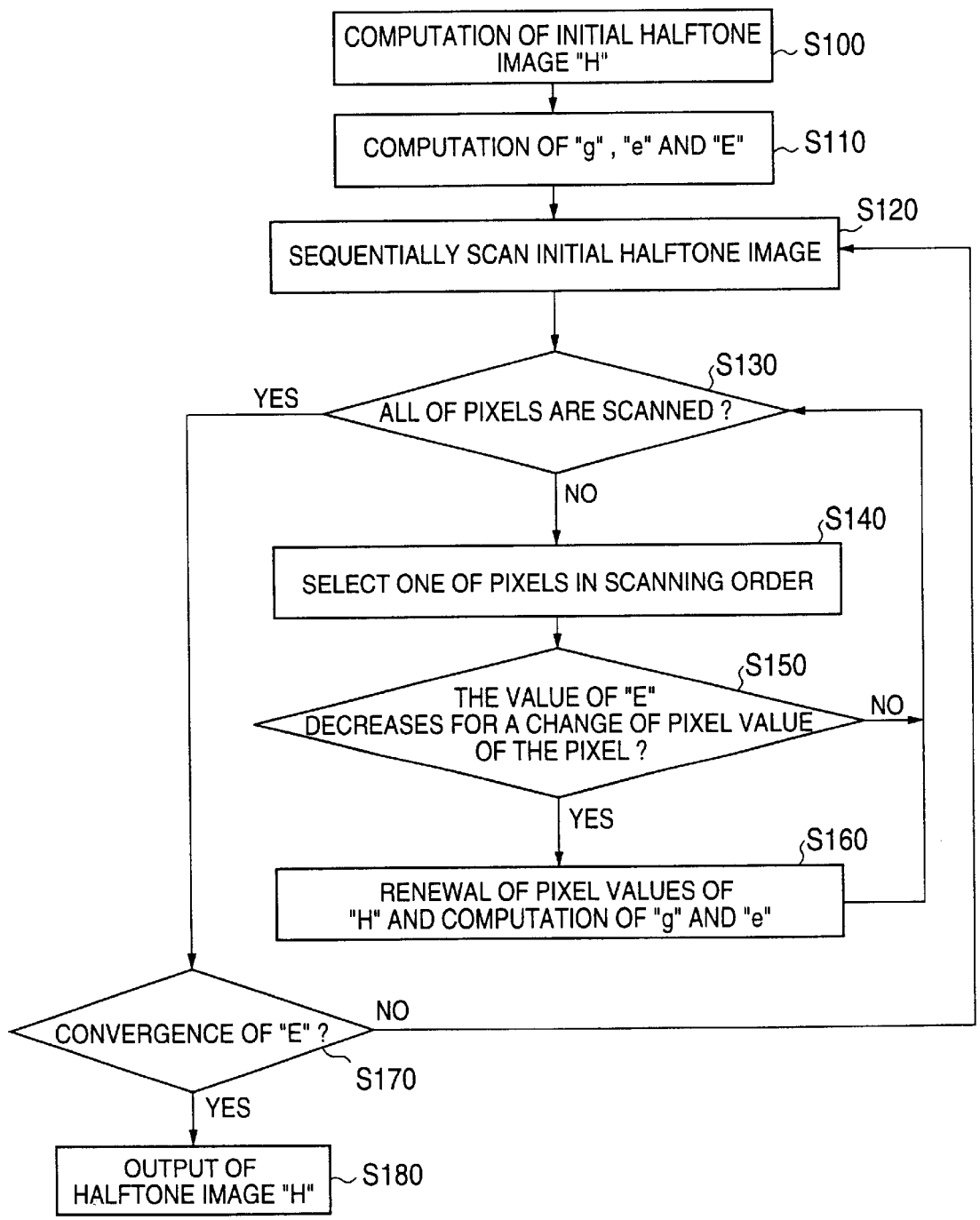
FIG. 9 is a flowchart for explaining a control process for a near-optimum halftone image computation executed by the digital halftoning apparatus of the first preferred embodiment.

Next, FIG. 9 shows a control process for a near-optimum halftone image computation executed by the digital halftoning apparatus of the first preferred embodiment.

Similar to the control process of FIG. 2, in the digital halftoning apparatus of the present invention, a computer readable medium is provided for storing program code instructions that cause the CPU (not shown) of the digital halftoning apparatus to execute the control process of FIG. 9. The elements 100 through 150 of the digital halftoning apparatus of the present invention may be configured into the program code instructions stored in the computer readable medium.

As shown in FIG. 9, at a start of the execution of the control process, the program code instructions cause the CPU to compute the initial halftone image from the original gray-scale image (step S100).

The program code instructions cause the CPU to compute the processed halftone image "g", the local visual-quality errors "e", and the sum "E" of the squares of the local visual-quality errors between the processed gray-scale image "f" output by the eye filter and the processed halftone image "g" output by the eye filter, for the respective pixels (x, y) of the gray-scale image (step S110).

The program code instructions cause the CPU to sequentially scan the initial halftone image "H" in a predetermined scanning direction (step S120). For example, the top-left pixel of the image "H" is first scanned, and the bottom-right pixel of the image "H" is last scanned.

After the start of the scanning of the initial halftone image "H", the program code instructions cause the CPU to determine whether all of the pixels of the image "H" are scanned (step S130). When the result at the step S130 is affirmative, the control of the CPU is transferred to step S170.

When the result at the step S130 is negative, the program code instructions cause the CPU to select one of the pixels of the image "H" (step S140).

After the step S140 is performed, the program code instructions cause the CPU to determine whether the value of the sum "E" decreases when the pixel value of the pixel selected in the step S140 is changed to a new value (step S150). When the result at the step S150 is negative, the control of the CPU is transferred to the above step S130.

When the result at the step S150 is affirmative, the program code instructions cause the CPU to renew the pixel value of the selected pixel to the new value (step S160). Further, in the step S160, the program code instructions cause the CPU to compute the processed halftone image "g" and the local visual-quality error "e" for the selected pixel. After the step S160 is performed, the contrl of the CPU is transferred to the step S130.

As described above, when the result at the step S130 is affirmative, the program code instructions cause the CPU to determine whether a convergence of the sum "E" is detected (step S170). For example, the convergence of the sum "E" may be detected by making a determination as to whether the sum "E" of the squares of the local visual-quality errors with respect to the entire image "H" is less than a predetermined threshold value. Alternatively, the convergence of the sum "E" may be detected by making a determination as to whether the value of the sum "E" does not decrease when a quantity of the entire image "H" is changed through a single scanning of the entire image "H".

When the result at the step S170 is negative, the control of the CPU is transferred to the above step S120. The scanning of the halftone image "H" is performed again.

When the result at the step S170 is affirmative, the program code instructions cause the CPU to output the resulting halftone image "H" (step S180).

According to the above-described control process, the optimum halftone image computation (OHIC) unit 140 of the present embodiment can generate a near-optimum output halftone image "H" from the initial halftone image through the repeated computation.

Next, a description will be provided of the renewal of the pixel value for the near-optimum halftone image computation.

In the following example, the halftone image is considered as being a bilevel image for the sake of simplicity of description.

The renewal of the pixel value is categorized into "toggle" type and "swap" type. In a case of the toggle-type renewal, the pixel value of the pixel of concern is inverted between 0 and 1 (a single way). In a case of the swap-type renewal, the pixel value of the pixel of concern is rotated from one of the pixel values of the eight neighboring pixels for that pixel to another (eight ways).

In the near-optimum halftone image calculation of the present embodiment, the nine ways of the renewal of the pixel value, including the toggle type and the swap type, are considered. For each of the respective pixels of the image, a change "ΔE" of the sum "E" is computed for each of the nine ways of the reneral of the pixel value.

Specifically, the computation of the change "ΔE" of the sum "E" is carried out as follows.

(1) In a case of the toggle-type renewal of the pixel (p, q), the following image portion $$\{(x, y); p-M-1 \leq x \leq p+M+1, q-M-1 \leq y \leq q+M+1\}$$

is considered. The change "E" of the sum "E" is computed for the swap-type renewal of the pixel value of the pixel (p, q).

(2) For the case of the swap-type renewal between the pixel (p, q) and the pixel (p', q'), the image portion:

{(x, y); min(p−M, p'−M)−1≤x≤max(p+M, p'+M)+1, min(q−M, q'−M)−1≤y≤max(q+M, q'+M)+1} is considered. The change " E" of the sum "E" is computed for each swap-type renewal of the pixel value between the pixel (p, q) and the pixel (p', q').

(3) One of the nine renewal operations that meets the conditions: ΔE<0 (or the value of the sum "E" decreases) and the absolute value of the change "ΔE" is the maximum is selected. Then, the pixel value of the pixel of concern in the initial halftone image "H" is renewed so as to be in accordance with the selected renewal operation.

(4) The following one of the pixels is selected in the scanning order. Then, the renewal operations and the computation of the change of the sum "E" described above are repeated for each selected pixel of the image "H" until a convergence of the sum "E" is detected.

In the above-described embodiment, the digital halftoning apparatus includes the printer output model unit 150 which provides the approximation of intensity distortions of the output halftone image caused by the printer dot gain. In the digital halftoning apparatus of this type, an intensity correction process may be performed which eliminates the intensity effects attributed by the printer output model unit 150.

Generally, the size of dots produced by the printer is larger than the size of pixels in the output halftone image produced by the digital halftoning apparatus. Accordingly, the intensity of a printed image produced by the printer is lower than the intensity of the output halftone image produced by the digital halftoning apparatus. In order to eliminate the lowness of the intensity of the printed image, the printer output model unit 150 may perform, for example, a simplified intensity correction process in which the degree of lowness of the intensity of the printed image is estimated and a gamma correction process for the printer is performed to correct the estimated degree of lowness.

Figure 10A:
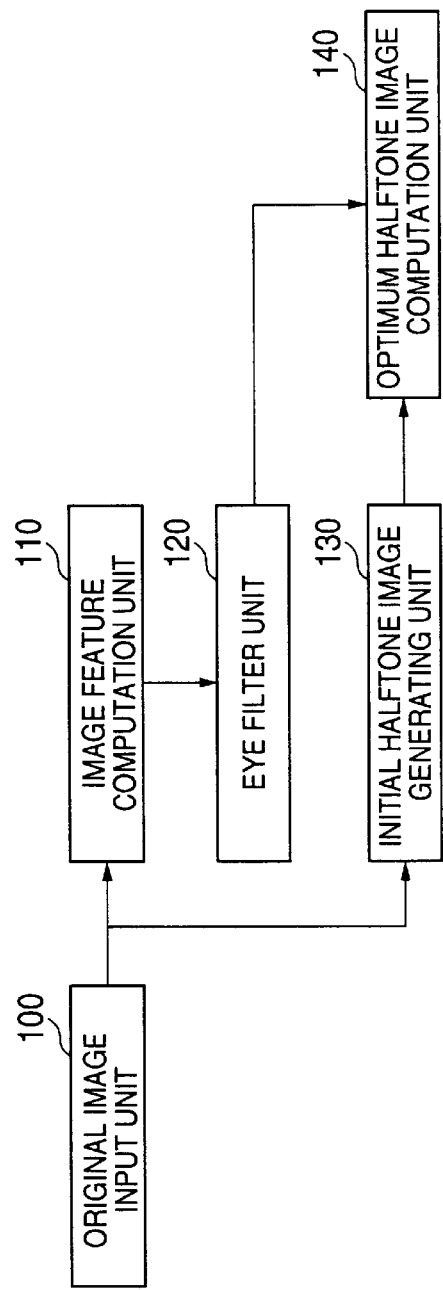
FIG. 10A is a functional block diagram of a second preferred embodiment of the digital halftoning apparatus of the invention.
Figure 10B:
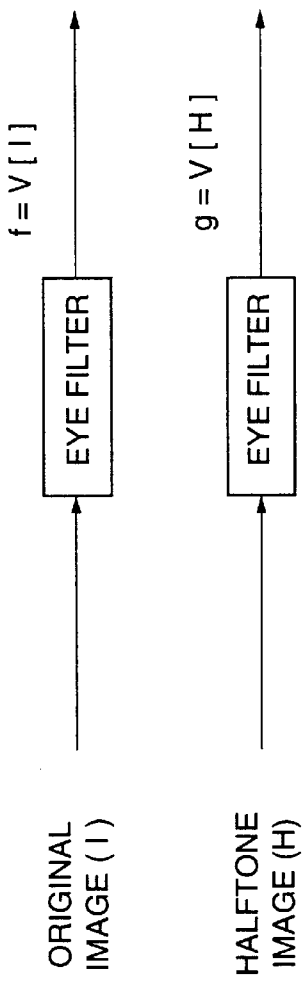
FIG. 10B is a diagram for explaining a reference model used by an optimum halftone image computation unit in the digital halftoning apparatus of the second preferred embodiment.

Next, a description will be provided of a second preferred embodiment of the digital halftoning apparatus of the invention with reference to FIG. 10A and FIG. 10B. In the present embodiment, the printer output model unit 150 as in the previous embodiment of FIG. 3 is not provided, and the above-described printer output model is not taken into consideration.

FIG. 10A shows the second preferred embodiment of the digital halftoning apparatus of the invention. FIG. 10B shows a reference model used by the optimum halftone image computation unit 140 in the digital halftoning apparatus of the second preferred embodiment.

In FIG. 10A, the elements of the digital halftoning apparatus which are essentially the same as corresponding elements in FIG. 3 are designated by the same reference numerals, and a description thereof will be omitted. As described above, the present embodiment differs from the previous embodiment of FIG. 3 only in that the printer output model unit 150 as in the previous embodiment is not provided in the present embodiment.

In the second preferred embodiment of the digital halftoning apparatus of FIG. 10A and FIG. 10B, the optimum halftone image computation (OHIC) unit 140 is configured into the least square model which uses the output of the eye filter when generating an output halftone image.

As shown in FIG. 10B, "f" denotes a processed gray-scale image output by the eye filter when processing the original gray-scale image "I", and "g" denotes a processed halftone image output by the eye filter when processing the halftone image "H". The processed gray-scale image "f" and the processed halftone image "g" are represented by $$f(x, y) = \sum_{m=-M}^{M} \sum_{n=-M}^{M} I(x-m, y-n)v_{xy}(m, n)$$

$$g(x, y) = \sum_{m=-M}^{M} \sum_{n=-M}^{M} p[H](x-m, y-n)v_{xy}(m, n)$$

In the above formulas, "M" denotes an integer, and "$v_{xy}$(m, n)" is an impulse response of the eye filter that is implemented as a two-dimensional digital FIR filter with a size (2M+1)*(2M+1). The parameters of the eye filter are determined based on the quantities of the local features $C_{xy}$ for the respective pixels (x, y) of the original image.

The sum "E" of the squares of the local visual-quality errors between the processed gray-scale image "f" output by the eye filter and the processed halftone image "g" output by the eye filter, which is computed by the OHIC unit 140, is represented by the above formula (1). The local visual-quality error "e(x, y)" at the pixel (x, y) is represented by the above formula (2). The eye-to-paper distance "$d_{xy}$" which is the parameter of the eye filter is represented by the above formula (3).

Similar to the previous embodiment of FIG. 3, the OHIC unit 140 in the present embodiment is configured to generate a near-optimum output halftone image in an iterative manner such that the sum "E" of the squares of the local visual-quality errors between the processed gray-scale image and the processed halftone image is minimized, the computation of the difference being started with the initial halftone image supplied by the IHIC unit 130. The algorithm of near-optimum output halftone image computation in the present embodiment is essentially the same as that of the previous embodiment of FIG. 9, except that the processed halftone image in the present embodiment is given by "g=V[H]" and the processed halftone image in the previous embodiment is given by "g=V[P[H]]".

Similar to the previous embodiment, the near-optimum halftone image calculation of the present embodiment is carried out as follows. The nine ways of the renewal of the pixel value, including the toggle type and the swap type, are considered. For each of the respective pixels of the image, a change of the sum "E" is computed for each of the nine ways of the renewal of the pixel value. The computation of the change "ΔE" of the sum "E" is carried out as follows.

(1) For the case of the toggle-type renewal of the pixel (p, q), the image portion:

{(x, y); p−M−1≤x≤p+M+1, q−M−1≤y≤q+M+1} is considered. The change "ΔE" of the sum "E" is computed for the swap-type renewal of the pixel value of the pixel (p, q).

(2) For the case of the swap-type renewal between the pixel (p, q) and the pixel (p', q'), the image portion:

{(x, y); min(p−M, p'−M)−1≤x≤max(p+M, p'+M)+1, min(q−M, q'−M)−1≤y≤max(q+M, q'+M)+1} is considered. The change "ΔE" of the sum "E" is computed for each swap-type renewal of the pixel value between the pixel (p, q) and the pixel (p', q').

(3) One of the nine renewal operations that meets the conditions: ΔE<0 (or the value of the sum "E" decreases) and the absolute value of the change "ΔE" is the maximum is selected. Then, the pixel value of the pixel of concern in the initial halftone image "H" is renewed so as to be in accordance with the selected renewal operation.

(4) The following one of the pixels is selected in the scanning order. Then, the renewal operations and the computation of the change of the sum "E" described above are repeated for each selected pixel of the image "H" until a convergence of the sum "E" is detected.

According to the above-described control process for the near-optimum halftone image computation, the OHIC unit 140 of the present embodiment can generate a near-optimum halftone image from the initial halftone image through the repeated computation.

Accordingly, the digital halftoning apparatus of the present embodiment is effective in providing the adaptive control of the human visual quality of the output image by using the visual-quality control filter based on the local features of the original image, including the smoothness and the sharpness, without excessively increasing the amount of computations needed to achieve the digital halftoning. It is possible to avoid the loss of the visual quality information in the output halftone image while providing the improvement of the smoothness and the sharpness.

The above algorithm of near-optimum halftone image computation requires that all of the original gray-scale image and the halftone image are stored in the image memory of the digital halftoning apparatus. However, the amount of memory available to the digital halftoning hardware is limited. If the amount of computations needed to achieve the digital halftoning exceeds the amount of memory available (for example, when the size of the image being processed is too large), it is impossible for the digital halftoning hardware to carry out the digital halftoning.

By taking the above problem into consideration, a third preferred embodiment of the digital halftoning method and apparatus of the invention is configured with an image partitioning unit and an image composition unit.

Next, a description will be provided of the third preferred embodiment of the digital halftoning apparatus of the invention with reference to FIG. 11 through FIG. 14.

Figure 11:
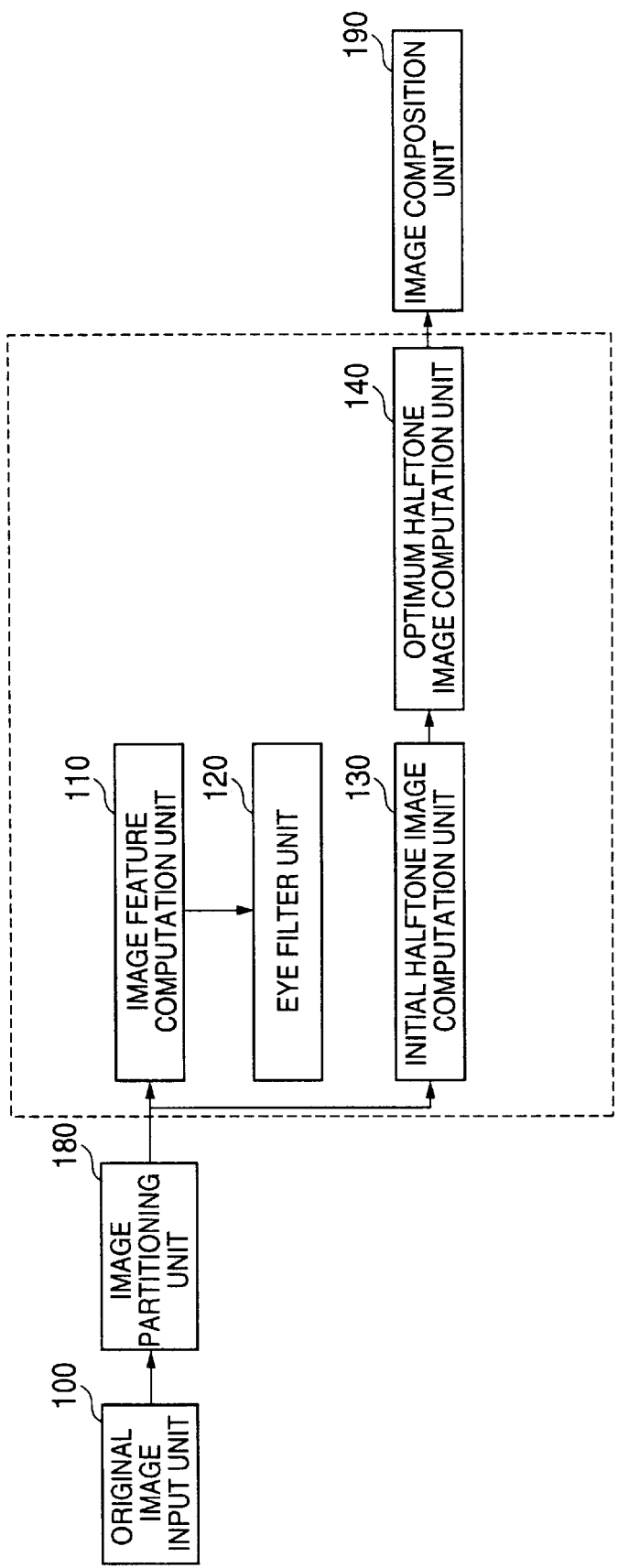
FIG. 11 is a functional block diagram of a third preferred embodiment of the digital halftoning apparatus of the invention.
Figure 12:
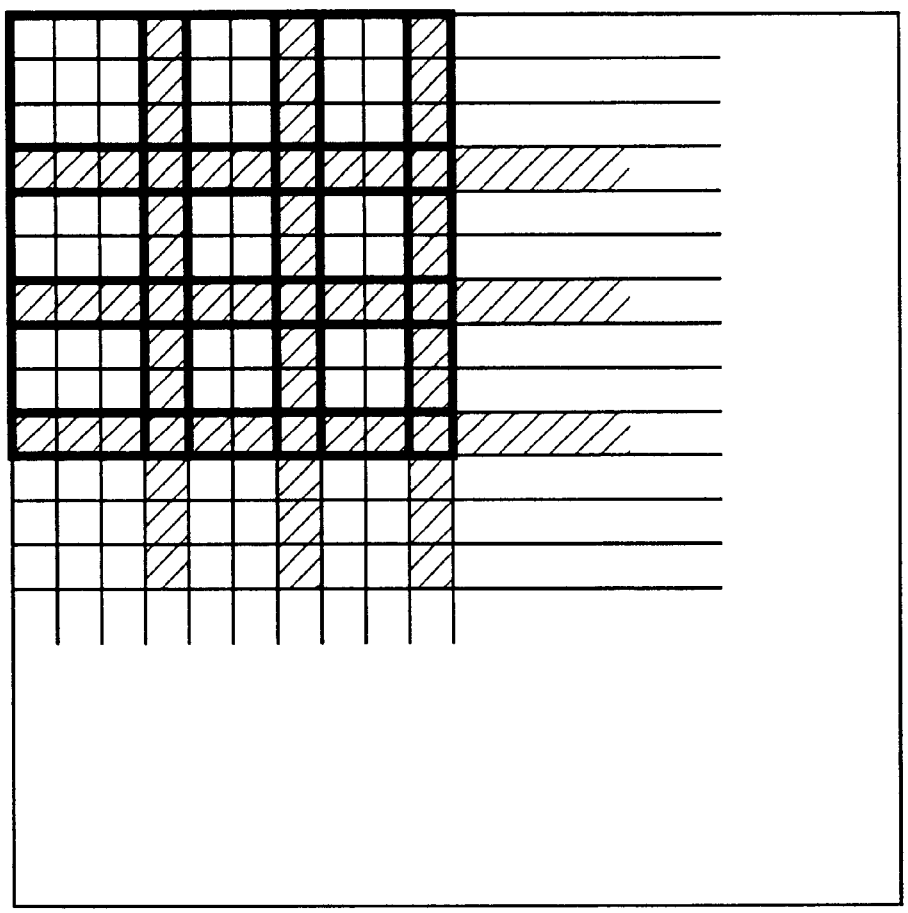
FIG. 12 is a diagram showing an example of a gray-scale image partitioning for use in the digital halftoning apparatus of the third preferred embodiment.

FIG. 11 shows the digital halftoning apparatus of the third preferred embodiment. FIG. 12 shows an example of a gray-scale image partitioning for use in the digital halftoning apparatus of the third preferred embodiment.

As shown in FIG. 11, the digital halftoning apparatus of the present embodiment generally comprises an original image input unit 100, an image partitioning unit 180, an image feature computation (IFC) unit 110, an eye filter unit 120, an initial halftone image computation (IHIC) unit 130, an optimum halftone image computation (OHIC) unit 140, and an image composition unit 190.

In the present embodiment of FIG. 11, the original image input unit 100, the IFC unit 110, the eye filter unit 120, the IHIC unit 130 and the OHIC unit 140 are essentially the same as corresponding units in the previous embodiment of FIG. 3 or FIG. 10A, and a description thereof will be omitted. It should be noted that the elements 110, 120, 130 and 140 within the block indicated by the dotted line in FIG. 11 are configured to process only one of partial overlapping image portions derived from the original image, but not configured to process the entire image.

The image partitioning unit 180 partitions the original gray-scale image supplied by the original image input unit 100, into blocks of partial overlapping image portions, each block having a predetermined number of pixels. In order to maintain the continuity of the halftone image, it is desirable that the image portions of the two adjacent blocks overlap each other. In addition, the blocks of partial overlapping image portions are preferably in the form of a rectangle or a square, for the sake of simplicity of subsequent image processing.

In the example of FIG. 12, the original image is partitioned into 4×4 rectangular blocks of partial overlapping image portions, each block having 4×4 pixels. The overlapping areas of the two adjacent blocks are indicated by the shading lines in FIG. 12. Preferably, the width of the overlapping areas of the two adjacent blocks corresponds to a width of at least "3M" pixels when "M" indicates an integer and the size of the two-dimensional digital FIR filter (or the eye filter) is given by $(2M+1)*(2M+1)$.

In the digital halftoning apparatus of FIG. 11, the IFC unit 110 provides computation of a quantity of local features of neighboring pixels for each of the respective pixels of one of the gray-scale image blocks.

The eye filter unit 120 includes a linear FIR filter that provides computation of visual characteristics of the processed image portion in the frequency domain based on the computation of the quantities of local features of the respective pixels of the block of concern supplied by the image feature computation unit 110. The FIR filter is configured as a function that depends on the resolution of the input digital image and the magnitude of the eye-to-paper distance.

The IHIC unit 130 generates an initial halftone image portion from each of the respective blocks of the gray-scale image by using the known halftoning technique, such as the bilevel rendition or error diffusion method using dithering or thresholding processes.

The initial halftone image portion output by the IHIC unit 130 is processed through the FIR filter of the eye filter unit 120 to output a processed initial halftone image portion with the controlled visual characteristics, and the controlled visual characteristics are supplied to the OHIC unit 140.

The OHIC unit 140 computes a sum of squares of local visual-quality errors between the processed gray-scale image portion output by the FIR filter and a processed halftone image portion output by the FIR filter, wherein the computation is started by taking the processed initial halftone image portion as a first one of the processed halftone image portions.

Further, the OHIC unit 140 generates an output halftone image portion from the initial halftone image portion through a repeated computation such that the sum of the squares of the local visual-quality errors, which is obtained for the gray-scale image portion and the initial halftone image portion, is reduced to a smaller value obtained for the gray-scale image portion and the output halftone image portion.

Similar to the previous embodiment, the OHIC unit 140 of the present embodiment is configured by using a heuristic algorithm that allows the OHIC unit 140 to generate a near-optimum output halftone image portion.

The image composition unit 190 generates an output halftone image by composition of the output halftone image portions obtained for all of the blocks of the gray-scale image.

In the above-described embodiment of the digital halftoning apparatus, the image partitioning unit 180 and the image composition unit 190 are provided and the units 110 through 140 are configured to sequentially process each of the gray-scale image blocks one by one. Hence, the digital halftoning apparatus of the present embodiment is effective in preventing the amount of computations needed to achieve the digital halftoning from being excessively increased.

Figure 13:
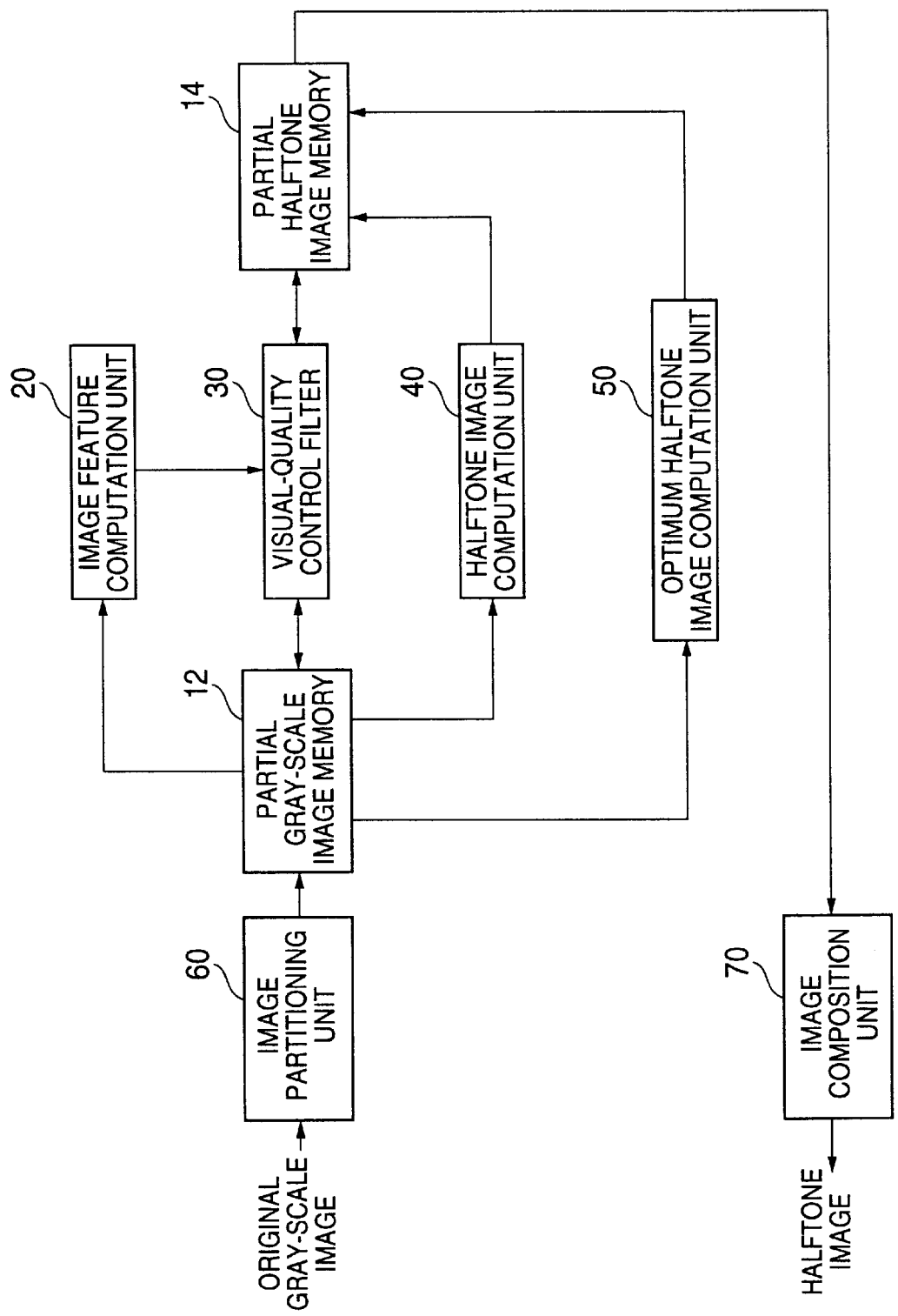
FIG. 13 is a block diagram of the digital halftoning apparatus to which the third preferred embodiment of the invention is applied.

FIG. 13 shows the digital halftoning apparatus to which the third preferred embodiment of the invention is applied.

Figure 14:
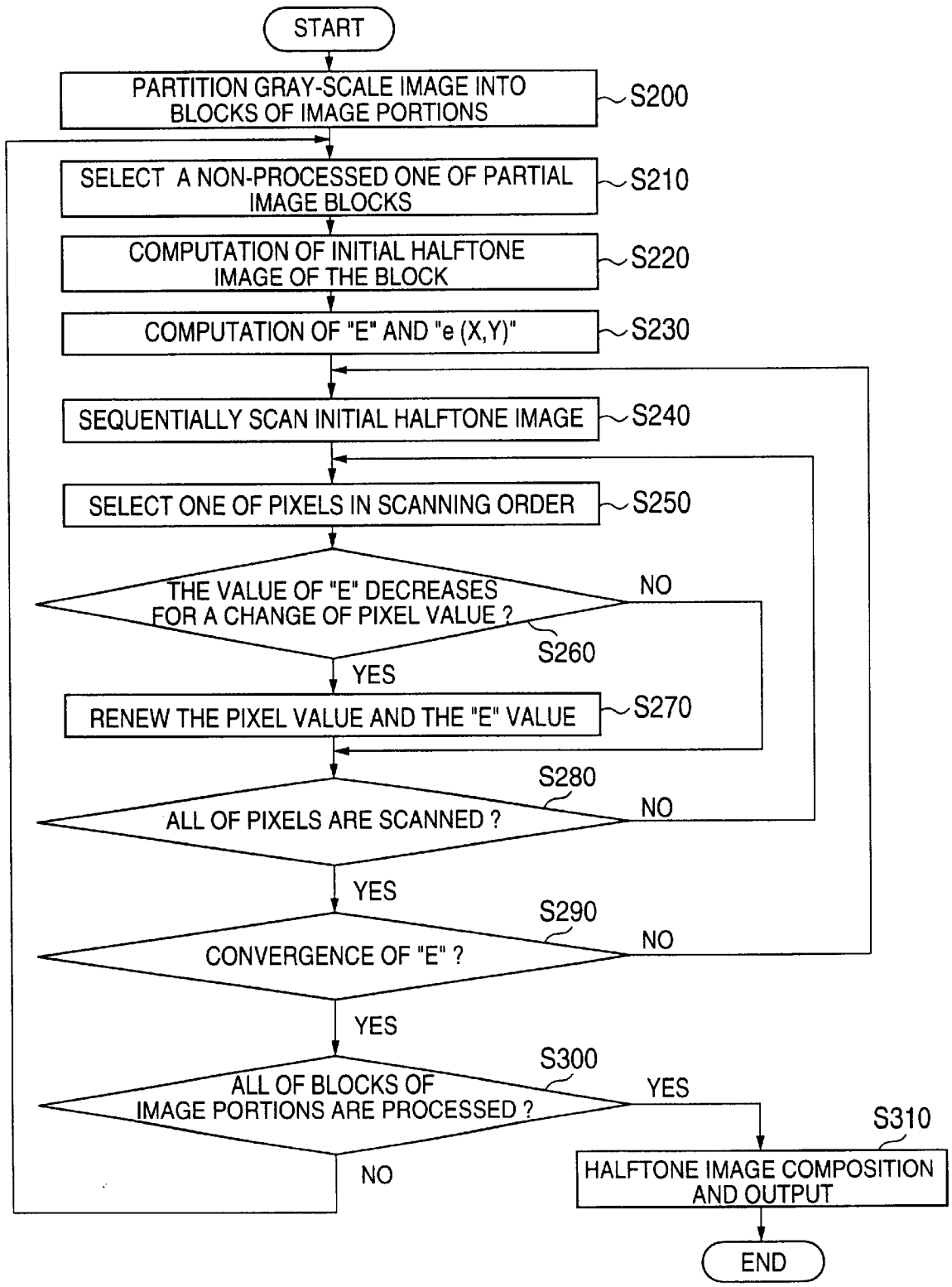
FIG. 14 is a flowchart for explaining a control process executed by the third preferred embodiment of the digital halftoning apparatus.

FIG. 14 is a flowchart for explaining a control process executed by the third preferred embodiment of the digital halftoning apparatus.

As shown in FIG. 13, the digital halftoning apparatus includes an image partitioning unit 60, an image composition unit 70, and a pair of partial image memories 12 and 14, which are provided to replace the image memory 10 as in the digital halftoning apparatus shown in FIG. 1, in addition to the elements 20, 30, 40 and 50 as in the digital halftoning apparatus shown in FIG. 1.

Similar to the control process of FIG. 9, in the digital halftoning apparatus of the present embodiment, a computer readable medium is provided for storing program code instructions that cause the CPU (not shown) of the digital halftoning apparatus to execute the control process of FIG. 14. The elements 20, 40, 50, 60 and 70 in the digital halftoning apparatus of FIG. 13 may be configured into the program code instructions stored in the computer readable medium.

As shown in FIG. 14, at a start of the execution of the control process, the program code instructions (the image partitioning unit 60) cause the CPU to partition the original gray-scale image into blocks of partial overlapping image portions, each block having a predetermined number of pixels (step S200). Each of the gray-scale image blocks is stored in the partial gray-scale image memory 12.

The program code instructions cause the CPU to select a non-processed one of the gray-scale image blocks (step S210). The selected block is supplied to the IFC unit 20 and the IHIC unit 40.

The program code instructions (the IHIC unit 40) cause the CPU to generate the initial halftone image portion from the gray-scale image block (step S220).

The program code instructions (the OHIC unit 50) cause the CPU to compute the processed halftone image portion "g", the local visual-quality errors "e", and the sum "E" of the squares of the local visual-quality errors between the processed gray-scale image portion "f" output by the eye filter and the processed halftone image portion "g" output by the eye filter, for the respective pixels (x, y) of the gray-scale image portion of concern (step S230).

The program code instructions cause the CPU to sequentially scan the initial halftone image portion "H" in a predetermined scanning direction (step S240). For example, the top-left pixel of the image portion "H" is first scanned, and the bottom-right pixel of the image portion "H" is last scanned.

After the start of the scanning of the initial halftone image portion "H", the program code instructions cause the CPU to select one of the pixels of the image portion "H" in the scanning order (step S250).

After the step S250 is performed, the program code instructions cause the CPU to determine whether the value of the sum "E" decreases when the pixel value of the pixel selected in the step S250 is changed to a new value (step S260). When the result at the step S260 is negative, the control of the CPU is transferred to step S280.

When the result at the step S260 is affirmative, the program code instructions cause the CPU to renew the pixel value of the selected pixel to the new value (step S270). Further, in the step S270, the program code instructions cause the CPU to compute the processed halftone image portion "g" and the local visual-quality error "e" for the selected pixel. After the step S270 is performed, the control of the CPU is transferred to the step S280.

The program code instructions cause the CPU to determine whether all of the pixels of the image portion "H" are scanned (step S280). When the result at the step S280 is affirmative, the control of the CPU is transferred to step S290.

When the result at the step S280 is negative, the control of the CPU is transferred to the above step S250.

As described above, when the result at the step S280 is affirmative, the program code instructions cause the CPU to determine whether a convergence of the sum "E" is detected (step S290). For example, the convergence of the sum "E" may be detected by making a determination as to whether the sum "E" of the squares of the local visual-quality errors with respect to the entire image portion "H" is less than a predetermined threshold value. Alternatively, the convergence of the sum "E" may be detected by making a determination as to whether the value of the sum "E" does not decrease when a quantity of the entire image portion "H" is changed through a single scanning of the entire image portion "H".

When the result at the step S290 is negative, the control of the CPU is transferred to the above step S240. The scanning of the halftone image portion "H" is performed again.

When the result at the step S290 is affirmative, the program code instructions cause the CPU to determine whether all of the gray-scale image blocks are processed (step S300). When the result at the step S300 is negative, the control of the CPU is transferred to the above step S210. When the result at the step S300 is affirmative, the control of the CPU is transferred to step S310.

The program code instructions (the image composition unit 70) cause the CPU to generate the output halftone image "H" by composition of the output halftone image portions for all of the gray-scale image blocks (step S310). Further, in the step S310, the program code instructions cause the CPU to output the produced output halftone image to the printer (not shown).

According to the above-described control process, the optimum halftone image computation (OHIC) unit 140 of the present embodiment can generate a near-optimum output halftone image "H" from the initial halftone image through the repeated computation.

The renewal of the pixel value for the near-optimum halftone image computation in the present embodiment is carried out in the same manner as in the previous embodiment of FIG. 9.

The determination of a decrease of the value of he sum "E" in the step S260 is carried out as follows.

When the pixel value of the selected pixel (p, q) is changed, the region of the image the local visual-quality errors of which are changed is limited to the neighboring pixels N(p, q), which include (2M+1)×(2M+1) pixels and are represented by the following formula $$N(p, q) = \{(i, j);\ p-M \leq i \leq q+M,\ q-M \leq j \leq q+M\}$$

A change "ΔE" of the value of the sum "E" when the pixel value of the pixel selected pixel (p, q) is changed to the new value is computed as follows.

$$\Delta E = \sum_{i=-M}^{M} \sum_{j=-M}^{M} a \cdot v_{p+i,q+j}(i, j)\{2e(p+i, q+j) + a \cdot v_{p+i,q+j}(i, j)\}$$

In the above formula, it is supposed that the pixel value of each pixel of the original gray-scale image varies from 0 to 255 and the pixel value of each pixel of the halftone image varies between 0 (black) and 255 (white). The coefficient "a" in the above formula is defined as follows: if H(p, q)=0, then "a"=255; if H p, q)=255, then "a"=−255.

The renewal of the pixel value and the value of the sum "E" in the above step S270 is carried out as follows:

H (p, q) ←———— H (p, q)+a e (p+i, q+j) ←———— e (p+i, q+j)+a $v_{p+i,q+j}$ (i, j)

(where i, j=−M, −K, 0, K, M)

E ←———— E+ΔE

The renewed pixel value of the selected pixel is stored in the partial halftone image memory 14.

When the digital halftoning method of the present invention is applied to a color gray-scale image (for example, a RGB color image), the digital halftoning is separately performed on the original image for each of the R, G and B color planes, and the output color halftone image is generated by composition of the separately produced color halftone images of the R, G and B color planes.

Figure 15:
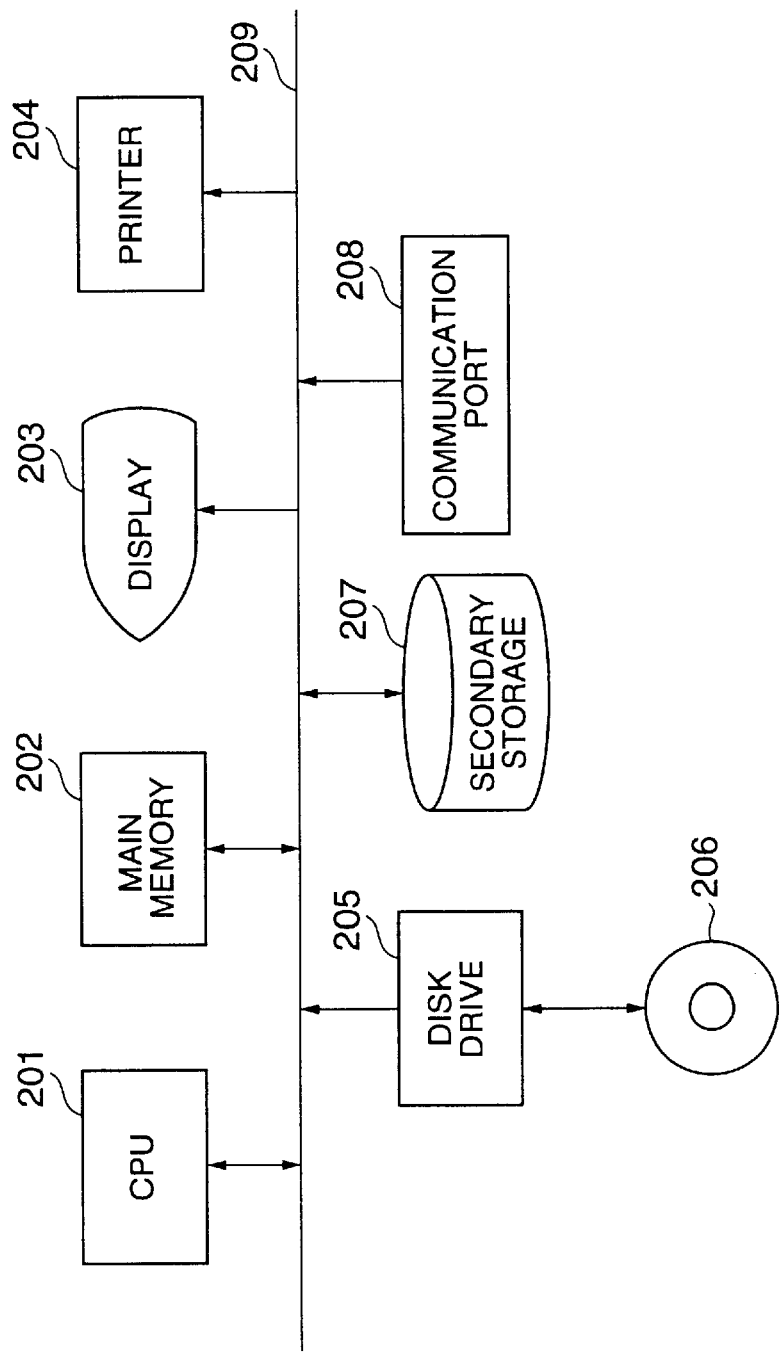
FIG. 15 is a block diagram of a digital halftoning system in which program code instructions stored in a computer readable medium cause a computer to execute a digital halftoning processing of the invention.

FIG. 15 shows a digital halftoning system which carries out the model-based digital halftoning processing of the present invention.

As shown in FIG. 15, the digital halftoning system generally comprises a central processing unit (CPU) 201, a main memory 202, a display 203, a printer 204, a disk drive 205, a secondary storage 207, a communication port 208, and a recording medium 206. In the digital halftoning system shown in FIG. 15, a bus 209 interconnects the CPU 201 and the other elements 202–205 and 207–208 of the digital halftoning system.

In the digital halftoning system of the present invention, the recording medium 206 stores program code instructions that cause the CPU 201 to execute the model-based digital halftoning processing of the present invention, namely, the control process or the near-optimum gray-scale image computation process related to the flowcharts of FIG. 2, FIG. 9 and FIG. 14. When the recording medium 206 is placed into the disk drive 205, the disk drive 205 loads the program code instructions from the recording medium 206 into the main memory 202. Alternatively, the disk drive 205 may temporarily store the program code instructions, read from the recording medium 206, into the secondary storage 207, and, when the necessity occurs, the disk drive 205 load the program code instructions from the secondary storage 207 into the main memory 202. The CPU 201 executes the respective steps of the control process or the near-optimum gray-scale image computation process in accordance with the program code instructions loaded into the main memory 202.

In the digital halftoning system of FIG. 15, the original gray-scale image, which is supplied by an external image processor (not shown), is received at the communication port 208 and loaded into the secondary storage 207 (or to the main memory 202). The output halftone image, which is produced by the digital halftoning processing of the present invention, is output to the printer 204 or the display 203. Alternatively, the output halftone image may be stored in the secondary storage 207.

In the present embodiment, any of the recording medium 206, the main memory 202 or the secondary storage 207 of the digital halftoning system corresponds to a computer readable medium in the claims. Further, the computer readable medium includes any instruction storage device, such as, for example, magnetic disks including floppy disks, optical disks including CDs or DVDs, magneto-optical disks including MOs, semiconductor memory cards such as IC cards and miniature cards and other types of computer usable devices and media.

In the present embodiment, the memory of the digital halftoning system may store encoded or non-encoded instructions. The instructions may be installed, for example, from the recording medium 206 (for example, a floppy disk) to the secondary storage 207 (for example, a hard disk) of the digital halftoning system first, transferred to the main memory 202 and then executed by the CPU 201 of the digital halftoning system. The memory of the digital halftoning system may store either all or a part of the instructions related to the flowcharts of FIG. 2, FIG. 9 and FIG. 1.

The present invention is not limited to the above-described embodiments, and variations and modifications may be made without departing from the scope of the present invention.

Further, the present invention is based on Japanese priority application No. 11-214226, filed on Jul. 28, 1999, and Japanese priority application No. 11-322917, filed on Nov. 12, 1999, the entire contents of which are hereby incorporated by reference.

What is claimed is:

1. A digital halftoning method for compressing a gray-scale image into a halftone image, the halftone image having pixels with a decreased number of gray levels, comprising the steps of:

providing a visual-quality control filter based on computation of a quantity of local features of neighboring pixels for each of respective pixels of the gray-scale image, the visual-quality control filter adaptively controlling visual characteristics for each of respective pixels of an image input to the filter;

generating an initial halftone image from the gray-scale image;

processing the gray-scale image through the visual-quality control filter to output a processed gray-scale image with the controlled visual characteristics;

processing the initial halftone image through the visual-quality control filter to output a processed initial halftone image with the controlled visual characteristics;

computing a sum of squares of local visual-quality errors between the processed gray-scale image and a processed halftone image, wherein the computation is started by taking the processed initial halftone image as a first processed halftone image; and generating an output halftone image from the initial halftone image through a repeated computation such that the sum of the squares of the local visual-quality errors obtained for the gray-scale image and the initial halftone image is reduced to a smaller value obtained for the gray-scale image and the output halftone image.

2. The digital halftoning method according to claim 1, wherein the visual-quality control filter is configured based on a modulation transfer function for representation of spatial frequency characteristics of a human eye.

3. The digital halftoning method according to claim 1, wherein the computation of the quantity of local features is provided by computation of a gradient of pixel values of the neighboring pixels for each of the respective pixels of the gray-scale image, and the visual-quality control filter controls the visual characteristics for the respective pixels of the input image, including smoothness and sharpness, based on the computation of the gradients of the gray-scale image.

4. The digital halftoning method according to claim 1, wherein the repeated computation of the sum of the squares of the local visual-quality errors is terminated when a convergence of the sum of the squares of the local visual-quality errors is detected.

5. The digital halftoning method according to claim 1, wherein, prior to the computation of the sum of the squares of the local visual-quality errors, approximation of intensity distortions of the output halftone image, caused by output characteristics of an output device, is provided for the generation of the output halftone image.

6. A digital halftoning method for compressing a gray-scale image into a halftone image, the halftone image having pixels with a decreased number of gray levels, comprising the steps of:

partitioning the gray-scale image into blocks of partial overlapping image portions, each block having a predetermined number of pixels;

providing a visual-quality control filter based on computation of a quantity of local features of neighboring pixels for each of the respective pixels of one of the blocks of the gray-scale image;

processing each of the respective blocks of the gray-scale image through the visual-quality control filter so as to output processed partial overlapping image portions each with the controlled visual quality;

generating an initial halftone image portion from each of the respective blocks of the gray-scale image;

processing each initial halftone image portion through the visual-quality control filter so as to output processed initial halftone image portions each with the controlled visual quality;

computing a sum of squares of local visual-quality errors between the processed gray-scale image portion and a processed halftone image portion for each block of the gray-scale image, wherein the computation is started by taking the processed initial halftone image portion as a first processed halftone image portion;

generating an output halftone image portion from the initial halftone image portion through a repeated computation, for each block of the gray-scale image, such that the sum of the squares of the local visual-quality errors obtained for the gray-scale image block and the initial halftone image portion is reduced to a smaller value obtained for the gray-scale image block and the output halftone image portion; and generating an output halftone image by composition of the output halftone image portions obtained for all of the blocks of the gray-scale image.

7. A digital halftoning apparatus for compressing a gray-scale image into a halftone image, the halftone image having pixels with a decreased number of gray levels, comprising:

an image memory for storing a gray-scale image and a halftone image;

an initial halftone image computation unit for generating an initial halftone image from the gray-scale image, and for storing the initial halftone image in the image memory;

an image feature computation unit for providing computation of a quantity of local features of neighboring pixels for each of respective pixels of the gray-scale image;

a visual-quality control filter unit for providing a visual-quality control filter based on the computation of the quantities of local features of the neighboring pixels for the respective pixels of the gray-scale image, the visual-quality control filter adaptively controlling visual characteristics for each of respective pixels of an image input to the filter, so the controlled visual characteristics of the processed input image are stored in the image memory; and an optimum halftone image computation unit for computing a sum of squares of local visual-quality errors between a processed gray-scale image output by the filter and a processed halftone image output by the filter, the computation being started by taking a processed initial halftone image output by the filter, as a first processed halftone image, and for generating an output halftone image from the initial halftone image through a repeated computation such that the sum of the squares of the local visual-quality errors obtained for the gray-scale image and the initial halftone image is reduced to a smaller value obtained for the gray-scale image and the output halftone image.

8. The digital halftoning apparatus according to claim 7 further comprising:

an image partitioning unit for partitioning the gray-scale image into blocks of partial overlapping image portions, each block having a predetermined number of pixels; and an image composition unit for generating an output halftone image by composition of output halftone image portions obtained for all of the blocks of the gray-scale image.

9. The digital halftoning apparatus according to claim 7, wherein the visual-quality control filter of the visual-quality control filter unit is configured based on a modulation transfer function for representation of spatial frequency characteristics of a human eye.

10. The digital halftoning apparatus according to claim 7, wherein the image feature computation unit provides computation of a gradient of pixel values of the neighboring pixels for each of the respective pixels of the gray-scale image as the computation of the quantity of local features, and the visual-quality control filter of the visual-quality control filter unit controls the visual characteristics for the respective pixels of the input image, including smoothness and sharpness, based on the computation of the gradients of the gray-scale image.

11. The digital halftoning apparatus according to claim 7, wherein the optimum halftone image computation unit is configured so that the repeated computation of the sum of the squares of the local visual-quality errors is terminated when a convergence of the sum of the squares of the local visual-quality errors is detected.

12. The digital halftoning apparatus according to claim 7, wherein the optimum halftone image computation unit 50 provides, prior to the computation of the sum of the squares of the local visual-quality errors, approximation of intensity distortions of the output halftone image caused by output characteristics of an output device, for the generation of the output halftone image.

13. A computer readable medium storing program code instructions for causing a processor to execute a digital halftoning processing in which a gray-scale image is compressed into a halftone image, the halftone image having pixels with a decreased number of gray levels, comprising:

first program code means for causing the processor to provide computation of a quantity of local features of neighboring pixels for each of respective pixels of the gray-scale image;

second program code means for causing the processor to provide a visual-quality control filter based on the computation of the quantities of local features of the neighboring pixels for the respective pixels of the gray-scale image, the visual-quality control filter adaptively controlling visual characteristics for each of respective pixels of an image input to the filter;

third program code means for causing the processor to generate an initial halftone image from the gray-scale image;

fourth program code means for causing the processor to process the gray-scale image through the visual-quality control filter to output a processed gray-scale image with the controlled visual characteristics;

fifth program code means for causing the processor to process processing the initial halftone image through the visual-quality control filter to output a processed initial halftone image with the controlled visual characteristics;

sixth program code means for causing the processor to compute a sum of squares of local visual-quality errors between a processed gray-scale image output by the filter and a processed halftone image output by the filter, the computation being started by taking a processed initial halftone image output by the filter, as a first processed halftone image; and seventh program code means for causing the processor to generate an output halftone image from the initial halftone image through a repeated computation such that the sum of the squares of the local visual-quality errors obtained for the gray-scale image and the initial halftone image is reduced to a smaller value obtained for the gray-scale image and the output halftone image.

14. The computer readable medium according to claim 13, further comprising:

eighth program code means for causing the processor to partition the gray-scale image into blocks of partial overlapping image portions, each block having a predetermined number of pixels;

ninth program code means for causing the processor to generate an output halftone image by composition of output halftone image portions obtained for all of the blocks of the gray-scale image.

* * * * *